(12) United States Patent
Aikawa

(10) Patent No.: US 10,425,564 B2
(45) Date of Patent: Sep. 24, 2019

(54) IMAGE PICKUP APPARATUS THAT IS CAPABLE OF BOUNCE EMISSION PHOTOGRAPHING, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Fumihiko Aikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/004,794

(22) Filed: Jun. 11, 2018

(65) Prior Publication Data

US 2018/0295268 A1 Oct. 11, 2018

Related U.S. Application Data

(63) Continuation of application No. 15/141,005, filed on Apr. 28, 2016, now Pat. No. 10,027,867.

(30) Foreign Application Priority Data

May 1, 2015 (JP) ................................ 2015-093996

(51) Int. Cl.
*H04N 5/225* (2006.01)
*H04N 5/235* (2006.01)
(Continued)

(52) U.S. Cl.
CPC ........... *H04N 5/2256* (2013.01); *G03B 15/06* (2013.01); *H04N 5/2351* (2013.01);
(Continued)

(58) Field of Classification Search
CPC ............... H04N 5/2256; H04N 5/2351; H04N 5/23212; H04N 5/23203; H04N 5/23209;
(Continued)

(56) References Cited

U.S. PATENT DOCUMENTS

| | | | | |
|---|---|---|---|---|
| 5,194,885 A | * | 3/1993 | Spencer | G03B 15/05 396/182 |
| 2002/0044771 A1 | * | 4/2002 | Nakagawa | G03B 15/02 396/62 |

(Continued)

FOREIGN PATENT DOCUMENTS

| | | |
|---|---|---|
| CN | 101075072 A | 11/2007 |
| JP | 08-190136 A | 7/1996 |

(Continued)

OTHER PUBLICATIONS

The above references were cited in a Dec. 4, 2018 Japanese Office Action, which is enclosed without an English Translation, that issued in Japanese Patent Application No. 2015-093996.

(Continued)

*Primary Examiner* — Nhan T Tran

(74) *Attorney, Agent, or Firm* — Cowan, Liebowitz & Latman, P.C.

(57) ABSTRACT

An image pickup apparatus capable of focusing correctly and of setting a bounce angle accurately. A lighting device that changes an irradiation angle is attached to an apparatus body. A first control unit drives the lighting device to perform pre-emission when the irradiation angle is controlled for bounce emission photographing where an object is photographed while being illuminated by a reflected light emitted from the lighting device and reflected by reflection material. A first distance measuring unit measures a first distance to the object and a second distance to the reflection material using the pre-emission. A second control unit sets up the irradiation angle based on the first and second distances and controls the lighting device to the set irradiation angle. A second distance measuring unit measures a third distance to the object during focus control. A prohibi- (Continued)

tion unit prohibits the pre-emission when the second distance measuring unit measures the third distance.

20 Claims, 29 Drawing Sheets

(51) Int. Cl.
 *H04N 5/232* (2006.01)
 *G03B 15/06* (2006.01)
(52) U.S. Cl.
 CPC ....... *H04N 5/2354* (2013.01); *H04N 5/23203* (2013.01); *H04N 5/23209* (2013.01); *H04N 5/23212* (2013.01); *H04N 5/23245* (2013.01)
(58) Field of Classification Search
 CPC ... H04N 5/2354; H04N 5/23245; G03B 15/06
 See application file for complete search history.

(56) References Cited

U.S. PATENT DOCUMENTS

| | | | | |
|---|---|---|---|---|
| 2009/0051784 A1* | 2/2009 | Oda | ........................ | G03B 17/00 348/229.1 |
| 2009/0208198 A1* | 8/2009 | Khuntia | ................. | G03B 15/06 396/174 |
| 2012/0002081 A1 | 1/2012 | Chou et al. | | |
| 2013/0314565 A1* | 11/2013 | Spielberg | ............... | G03B 15/05 348/224.1 |
| 2014/0368729 A1* | 12/2014 | Takai | ................... | H04N 5/2354 348/371 |
| 2014/0375837 A1* | 12/2014 | Ichihara | ............... | H04N 5/2354 348/222.1 |
| 2015/0037021 A1* | 2/2015 | Umehara | ............. | H04N 5/2354 396/174 |
| 2015/0109754 A1* | 4/2015 | Takenaka | ............... | G03B 15/03 362/4 |
| 2015/0156389 A1* | 6/2015 | Umehara | ............... | G03B 15/05 348/242 |
| 2015/0244921 A1* | 8/2015 | Yamamoto | ........... | H04N 5/2354 348/345 |
| 2015/0309390 A1* | 10/2015 | Yamamoto | ............. | G03B 15/05 348/370 |

FOREIGN PATENT DOCUMENTS

| | | |
|---|---|---|
| JP | 11-275412 A | 10/1999 |
| JP | 2009-063612 A | 3/2009 |
| JP | 2012-178666 A | 9/2012 |
| JP | 2015-004932 A | 1/2015 |

OTHER PUBLICATIONS

The above references was cited in a Dec. 18, 2018 Chinese Office Action, which is enclosed with an English Translation, that issued in Chinese Patent Application No. 201610286505.8.

* cited by examiner

FIG. 3B

AUTOMATIC BOUNCE SETTING/RELEASING

|  | FIRST BYTE | SECOND BYTE | THIRD BYTE |
|---|---|---|---|
| CAMERA | COMMAND CS 80H | COMMAND NUMBER 011(0BH) | DATA 1 01 |
| STROBE | xx | xx | xx |

AUTOMATIC BOUNCE SETTING/RELEASING

|  | FIRST BYTE | SECOND BYTE | THIRD BYTE |
|---|---|---|---|
| CAMERA | COMMAND SC 01H | xx | xx |
| STROBE | xx | COMMAND NUMBER 010(0AH) | DATA 1 01 |

AUTOMATIC BOUNCE DISTANCE MEASURING METHOD

|  | FIRST BYTE | SECOND BYTE | THIRD BYTE | FOURTH BYTE |
|---|---|---|---|---|
| CAMERA | COMMAND CS 80H | COMMAND NUMBER 091(5BH) | DATA 1 01 | DATA 2 10 |
| STROBE | xx | xx | xx | xx |

AUTOMATIC BOUNCE DISTANCE MEASURING METHOD

|  | FIRST BYTE | SECOND BYTE | THIRD BYTE | FOURTH BYTE |
|---|---|---|---|---|
| CAMERA | COMMAND SC 01H | xx | xx | xx |
| STROBE | xx | COMMAND NUMBER 090(5AH) | DATA 1 02 | DATA 2 10 |

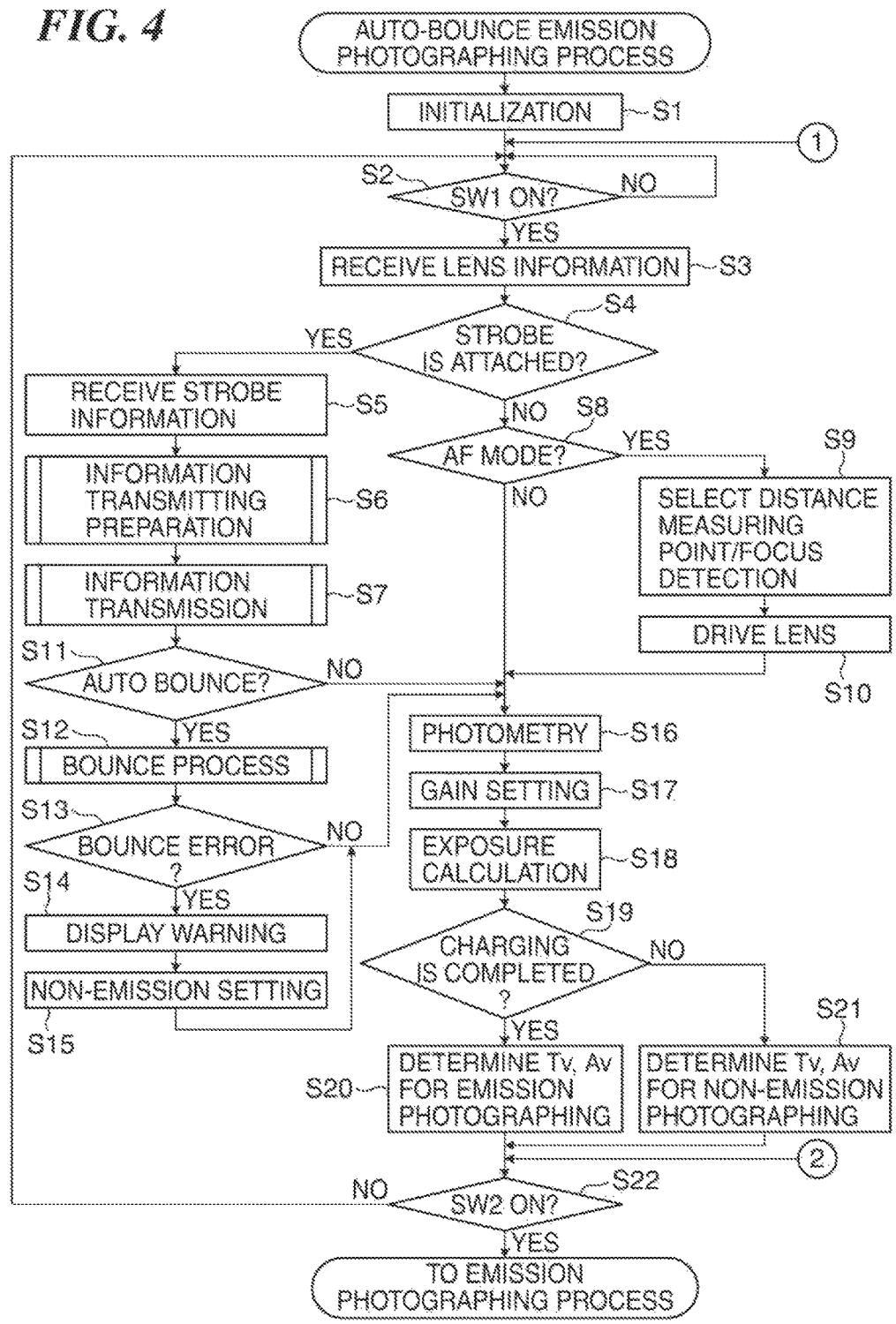

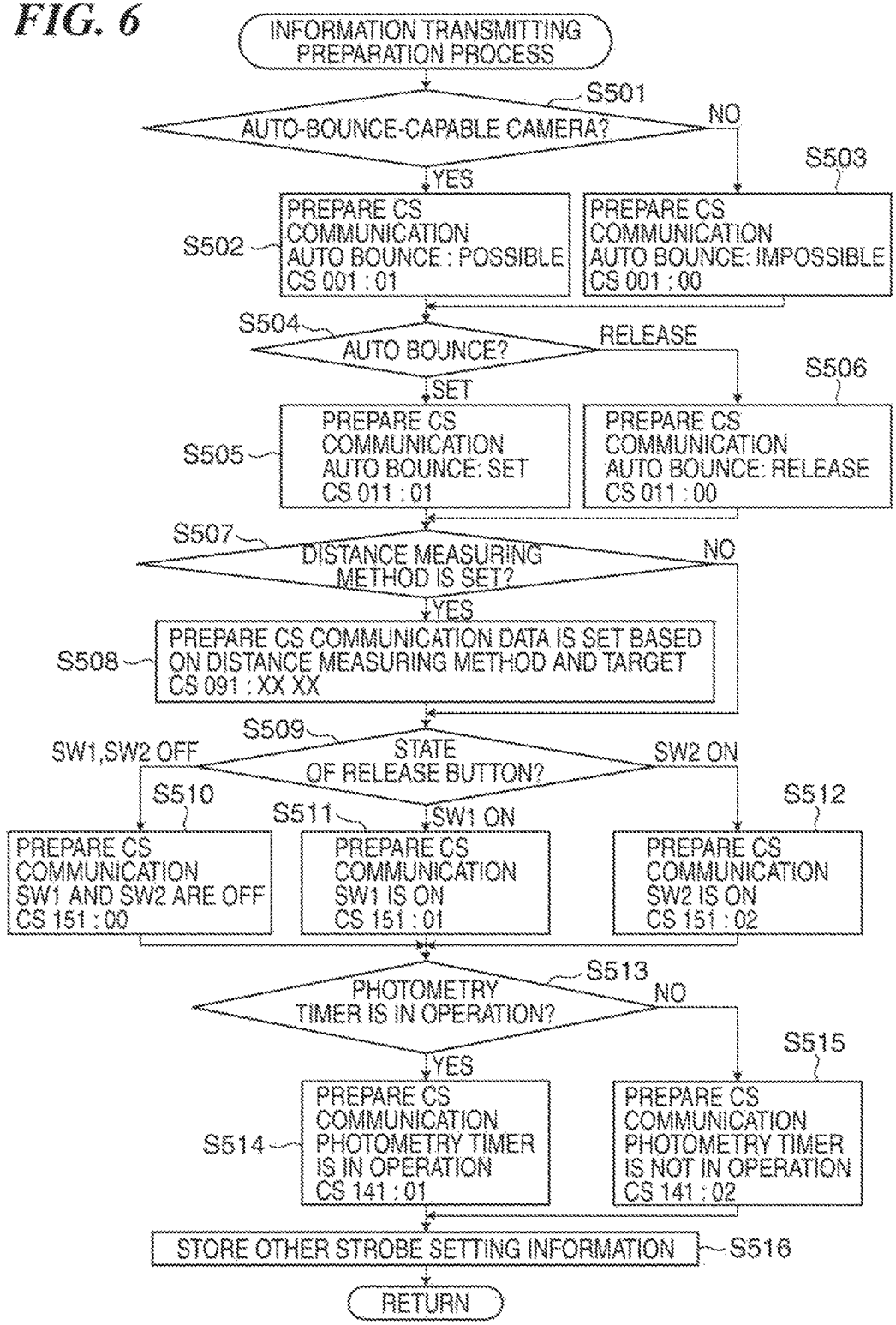

*FIG. 7A*

| COMMAND | COMMAND NO. | CONTENT | DATA |
|---|---|---|---|
| SC HEX:01 | 000 HEX:00 | AUTO BOUNCE FUNCTION | 0:NO<br>1:YES |
| SC HEX:01 | 010 HEX:A | AUTO BOUNCE SET/RELEASE | 0:RELEASE<br>1:SET |
| SC HEX:01 | 020 HEX:14 | AUTO BOUNCE DRIVE RANGE | 0:BOTH POSSIBLE<br>1:H-POSSIBLE<br>2:V-POSSIBLE |
| SC HEX:01 | 030 HEX:1E | AUTO BOUNCE H-DRIVE RANGE | START-END |
| SC HEX:01 | 040 HEX:28 | AUTO BOUNCE V-DRIVE RANGE | START-END |
| SC HEX:01 | 050 HEX:32 | AUTO BOUNCE IN OPERATION (MOTOR) | 0:STOP<br>1:V-OPERATION<br>2:H-OPERATION |
| SC HEX:01 | 060 HEX:3C | AUTO BOUNCE ERROR | 0:NORMAL<br>1:ERROR |
| SC HEX:01 | 070 HEX:46 | CURRENT BOUNCE ANGLE (V) INFORMATION | 000H ~ 168H |
| SC HEX:01 | 080 HEX:50 | CURRENT BOUNCE ANGLE (H) INFORMATION | 000H ~ 168H |
| SC HEX:01 | 090 HEX:5A | AUTO BOUNCE DISTANCE MEASURING METHOD | 0x:OBJECT<br>1x:CEILING(WALL)<br>x0:PRE-EMISSION<br>x1:STROBE AF<br>x2:CAMERA AF |
| SC HEX:01 | 100 HEX:64 | VERTICAL DISTANCE INFORMATION | DATA |
| SC HEX:01 | 110 HEX:6E | OBJECT DISTANCE INFORMATION | DATA |
| SC HEX:01 | 120 HEX:78 | STROBE POSTURE DIFFERENCE INFORMATION | H-DATA<br>V-DATA<br>Z-DATA |
| SC HEX:01 | 130 HEX:82 | AUTO BOUNCE PRE-EMISSION | 0:WAITING<br>1:EMITTING |

FIG. 7B

| COMMAND | COMMAND NO. | CONTENT | DATA |
|---|---|---|---|
| CS | 001 | AUTO-BOUNCE-CAPABLE CAMERA | |
| HEX:08 | HEX:01 | | 0:INCAPABLE |
| | | | 1:CAPABLE |
| CS | 011 | AUTO BOUNCE SET/RELEASE | |
| HEX:08 | HEX:0B | | 0:RELEASE |
| | | | 1:SET |
| CS | 021 | AUTO BOUNCE DRIVE RANGE CHECK | |
| HEX:08 | HEX:15 | | 0:BOTH POSSIBLE |
| | | | 1:H-POSSIBLE |
| | | | 2:V-POSSIBLE |
| CS | 031 | AUTO BOUNCE H-DRIVE RANGE INSTRUCTION | START-END |
| HEX:08 | HEX:1F | | |
| CS | 041 | AUTO BOUNCE V-DRIVE RANGE INSTRUCTION | START-END |
| HEX:08 | HEX:29 | | |
| CS | 051 | AUTO BOUNCE IN OPERATION (MOTOR) | |
| HEX:08 | HEX:33 | | 0:STOP |
| | | | 1:V-OPERATION |
| | | | 2:H-OPERATION |
| CS | 071 | BOUNCE ANGLE INSTRUCTION(V) | |
| HEX:08 | HEX:47 | | 000H ~ 168H |
| CS | 081 | BOUNCE ANGLE INSTRUCTION(H) | |
| HEX:08 | HEX:51 | | 000H ~ 168H |
| CS | 091 | AUTO BOUNCE DISTANCE MEASURING | 0x:OBJECT |
| HEX:08 | HEX:5B | METHOD INSTRUCTION | 1x:CEILING(WALL) |
| | | | x0:PRE-EMISSION |
| | | | x1:STROBE AF |
| | | | x2:CAMERA AF |
| CS | 101 | VERTICAL DISTANCE INFORMATION | |
| HEX:08 | HEX:65 | | DATA |
| CS | 111 | OBJECT DISTANCE INFORMATION | |
| HEX:08 | HEX:6F | | DATA |

FIG. 7C

| COMMAND | COMMAND NO | CONTENT | DATA |
|---|---|---|---|
| CS HEX:08 | 121 HEX:79 | CAMERA POSTURE DIFFERENCE INFORMATION | H-DATA |
| | | | V-DATA |
| | | | Z-DATA |
| CS HEX:08 | 131 HEX:83 | PRE-EMISSION PROHIBITION | 0:PERMIT |
| | | | 1:PROHIBIT |
| CS HEX:08 | 141 HEX:8D | PHOTOMETRY TIMER | 0:NOT IN OPERATION |
| | | | 1:IN OPERATION |
| CS HEX:08 | 151 HEX:97 | STATE OF RELEASE BUTTON | 0:SW1,SW2 OFF |
| | | | 1: SW1 ON |
| | | | 2: SW2 ON |
| CS HEX:08 | 161 HEX:A1 | CHANGE OF OPERATION SPEED | 0: NORMAL |
| | | | 1: LOW(SILENT) |
| | | | 2:HIGH |
| CS HEX:08 | 171 HEX:AB | BOUNCE ANGLE CALCULATION | 0:STROBE |
| | | | 1:CAMERA |
| CS HEX:08 | 181 HEX:B5 | BOUNCE DRIVE INSTRUCTION SELECTION | 0:STROBE |
| | | | 1:CAMERA |
| CS HEX:08 | 191 HEX:BF | DISTANCE MEASURING POINT INFORMATION | DATA XX XX |
| CS HEX:08 | 192 HEX:C0 | AF STORAGE INFORMATION | 0:WAITING |
| | | | 1:CHARGING |

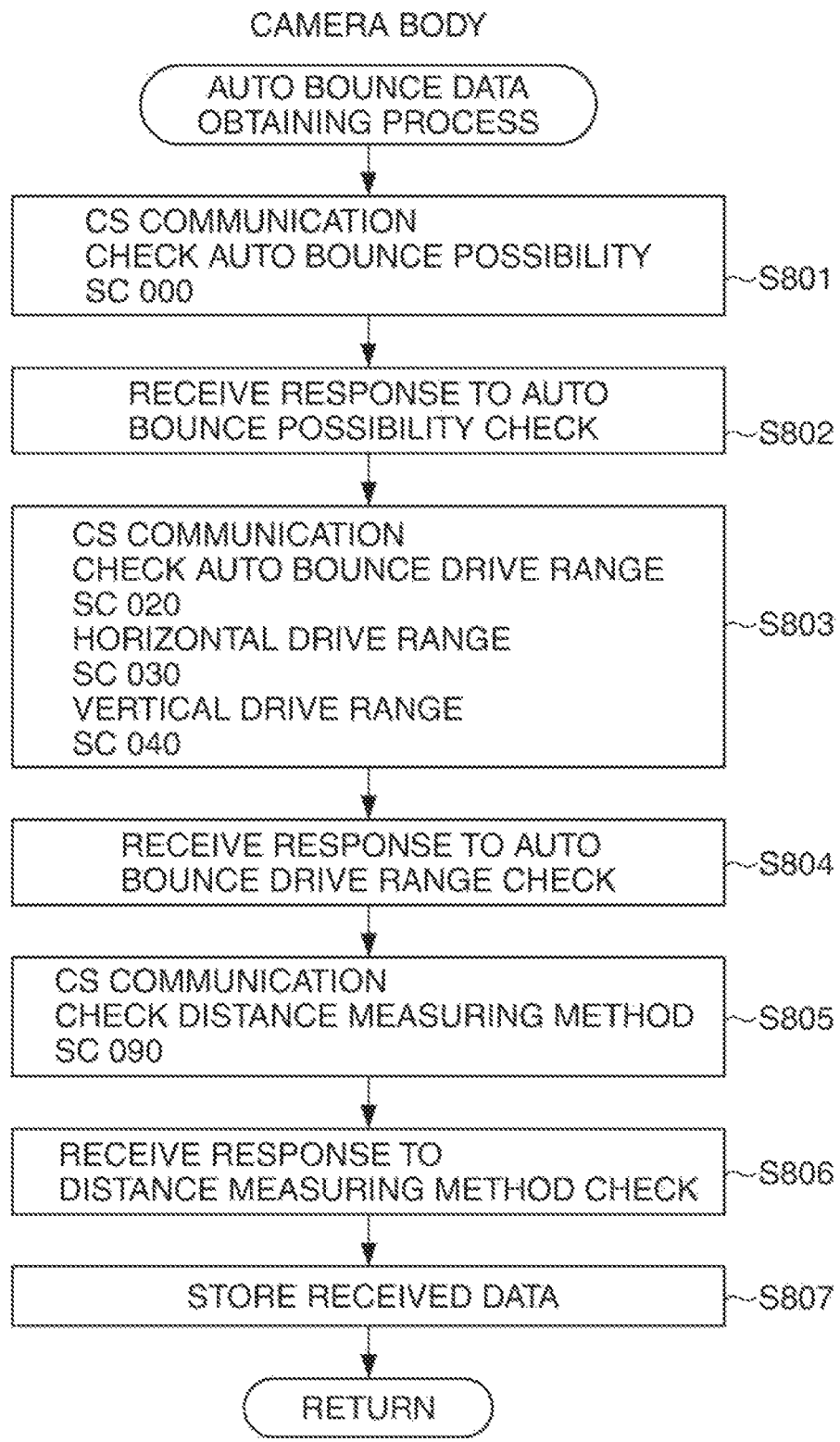

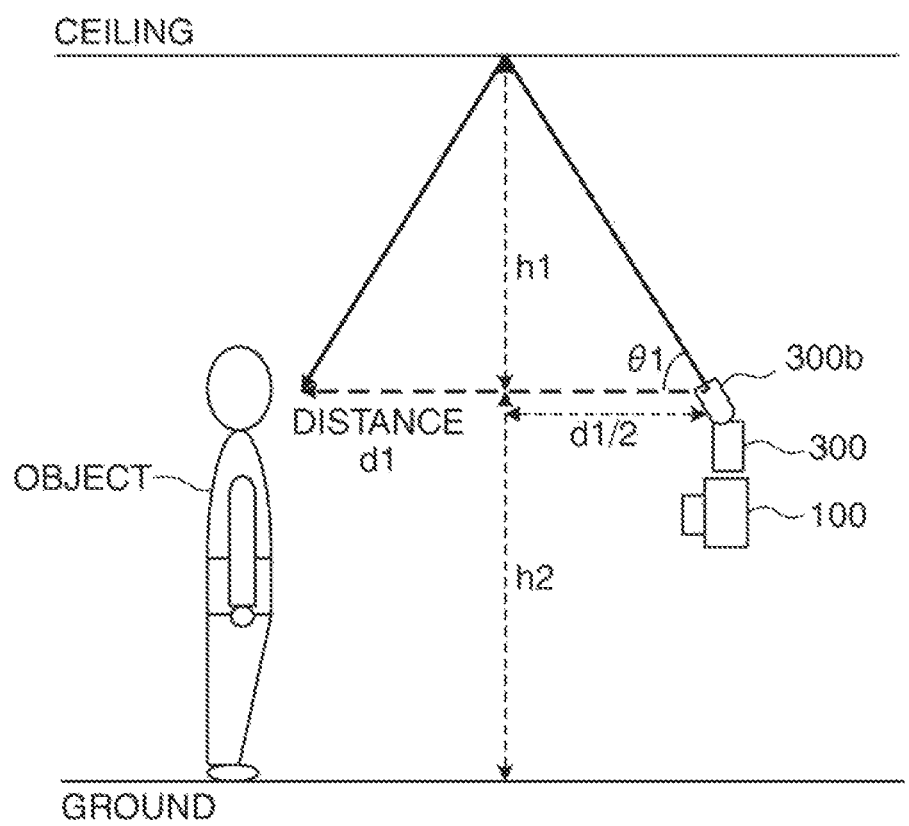

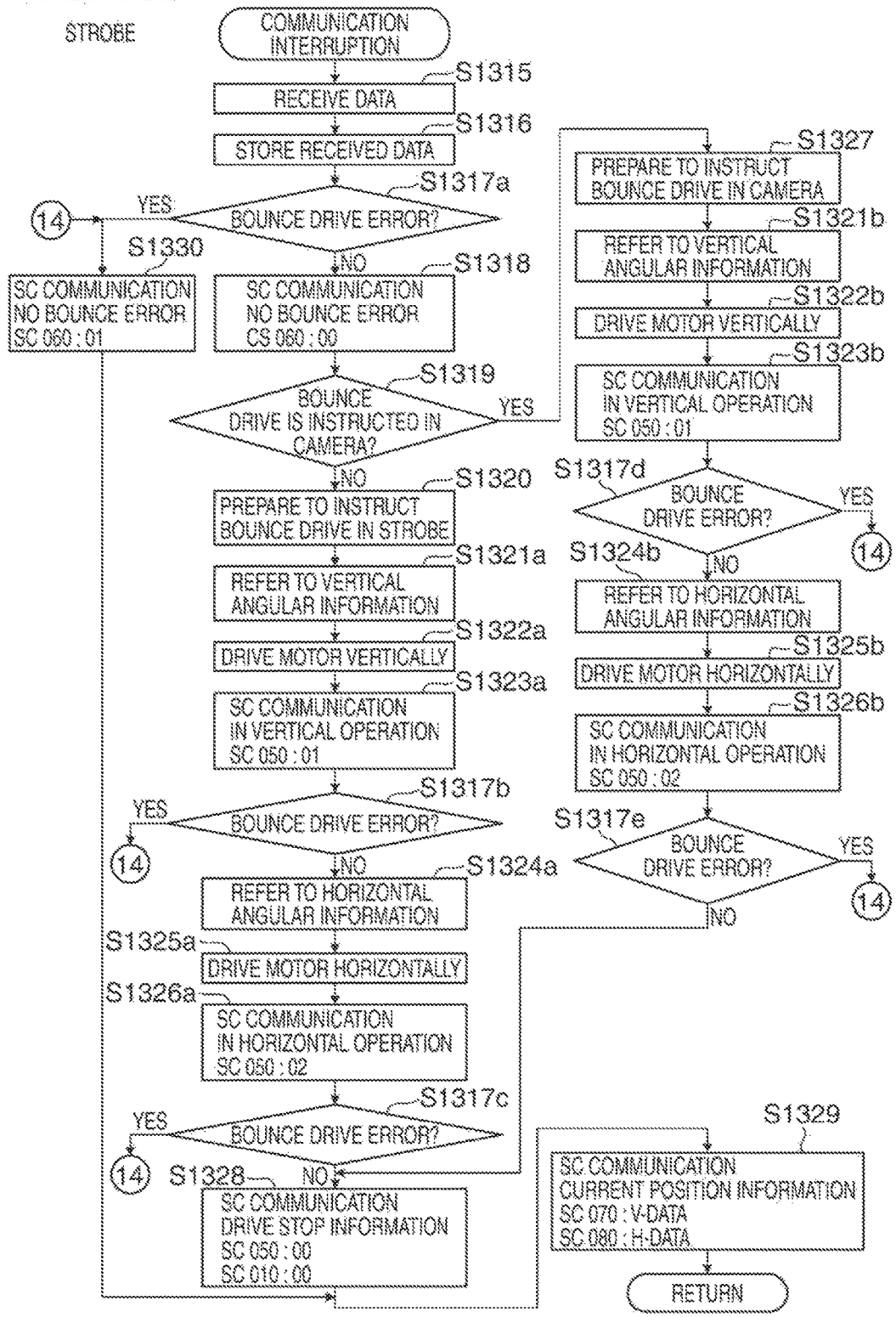

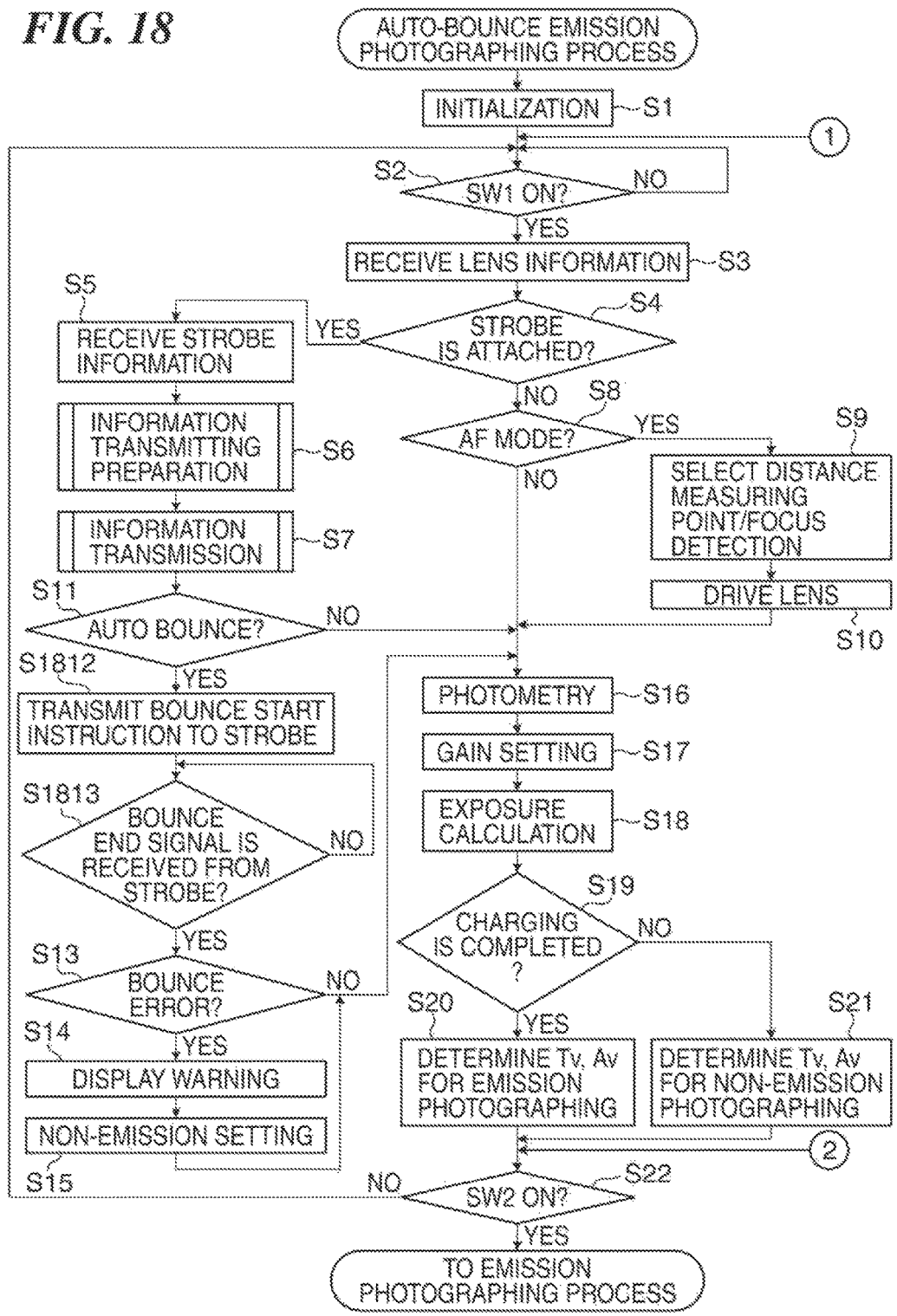

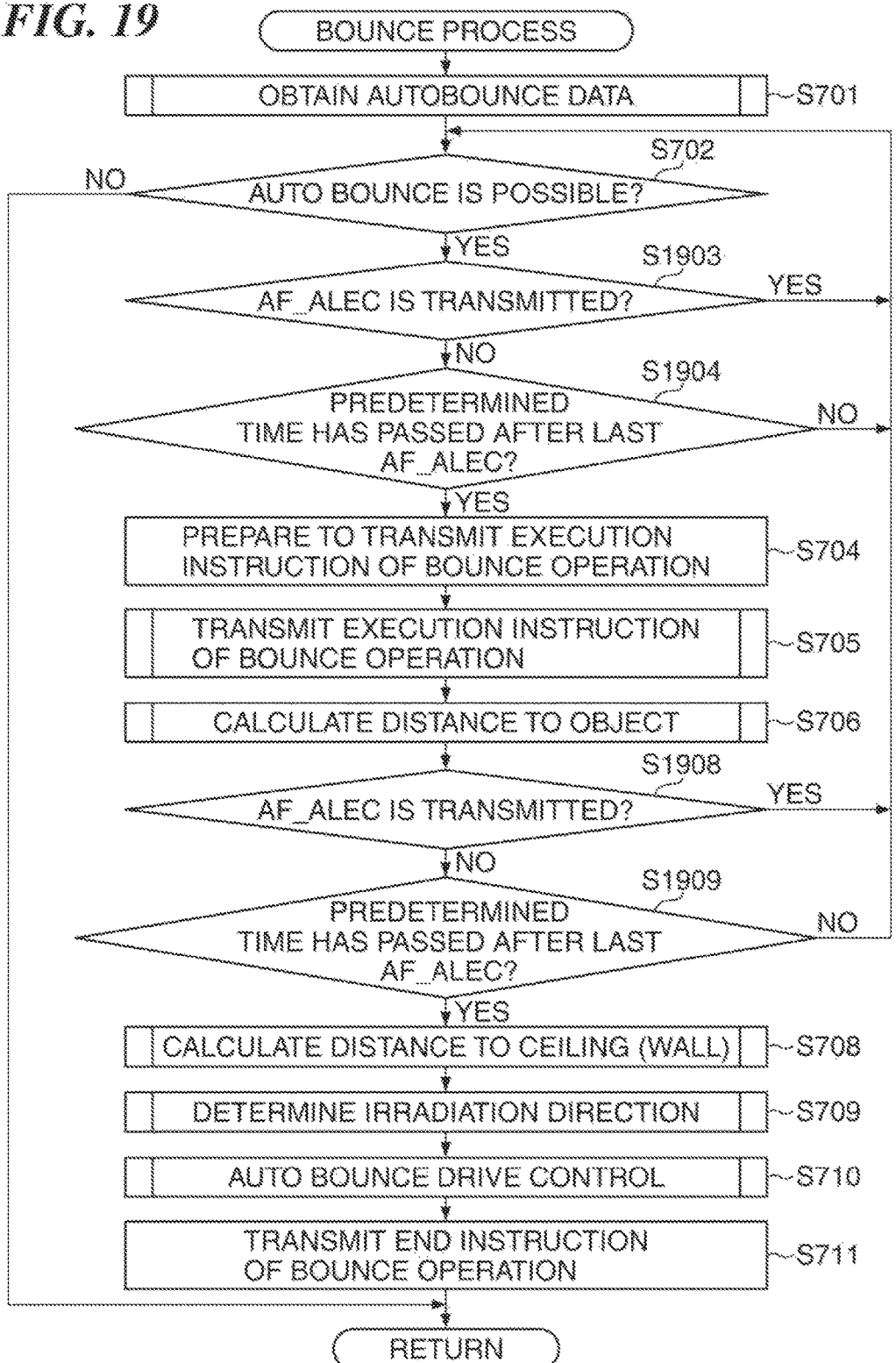

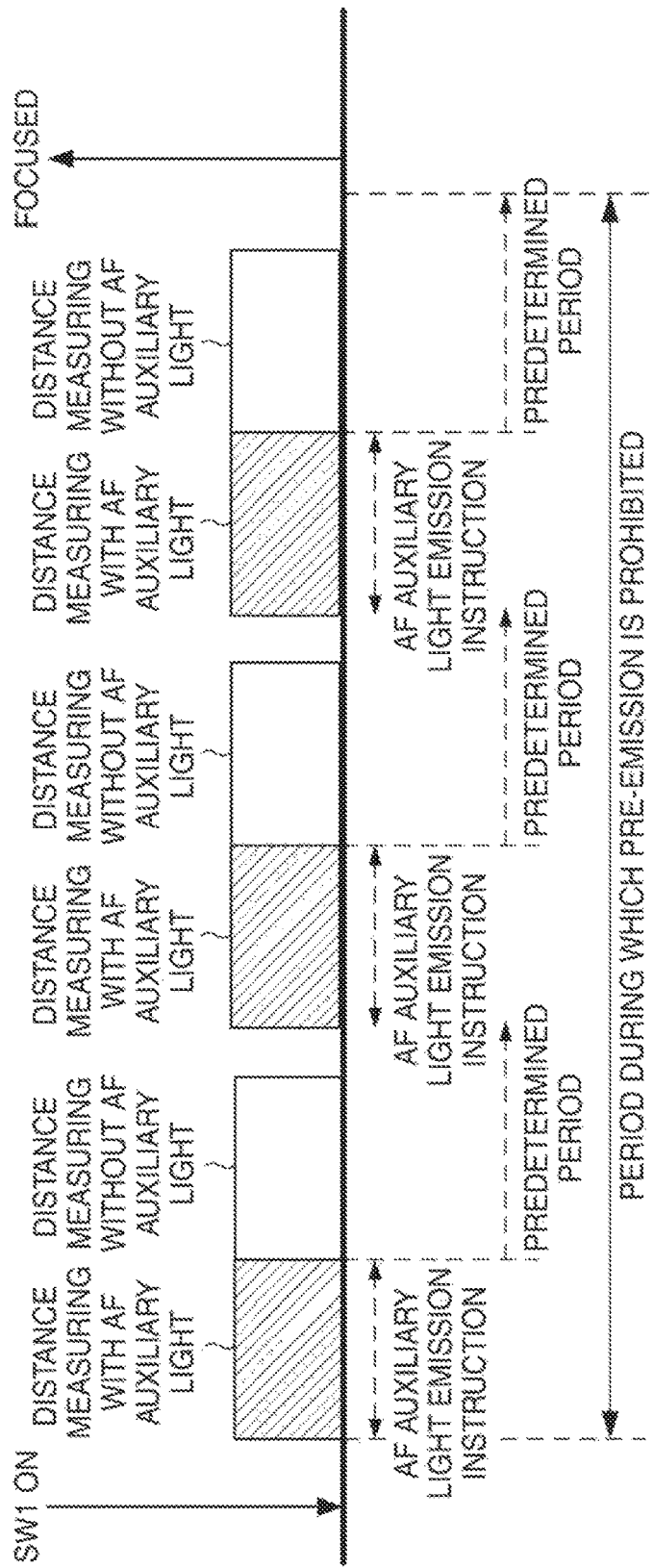

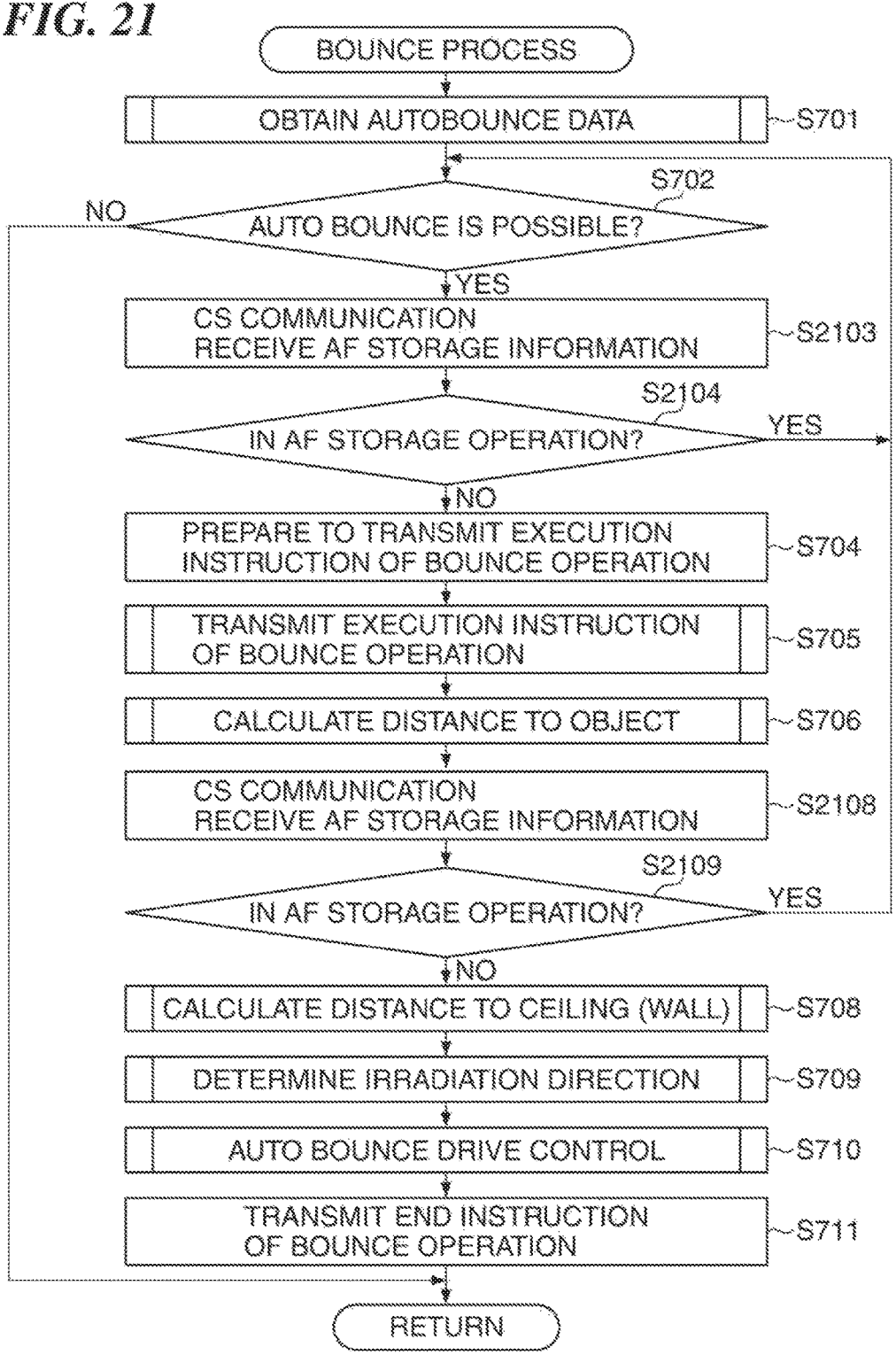

IMAGE PICKUP APPARATUS THAT IS CAPABLE OF BOUNCE EMISSION PHOTOGRAPHING, CONTROL METHOD THEREFOR, AND STORAGE MEDIUM STORING CONTROL PROGRAM THEREFOR

CROSS-REFERENCE TO RELATED APPLICATIONS

This application is a continuation of application Ser. No. 15/141,005, filed Apr. 28, 2016 the entire disclosure of which is hereby incorporated by reference.

BACKGROUND OF THE INVENTION

Field of the Invention

The present invention relates to an image pickup apparatus that is capable of bounce emission photographing, a control method therefor, and a storage medium storing a control program therefor, and in particular, relates to illumination control for illuminating and photographing an object.

Description of the Related Art

There is a known emission photographing method that makes a lighting device emit light toward a ceiling etc. to illuminate an object with diffuse reflection from the ceiling when the object is photographed. Hereinafter the method is referred to as bounce emission photographing. Since the bounce emission photographing illuminates an object indirectly with the light from the lighting device, the object is depicted with soft light.

When a bounce angle that shows an irradiation angle of diffuse reflection with which an object is irradiated is determined in the bounce emission photographing, an object distance between an image pickup apparatus and an object is measured (hereinafter referred to as object pre-emission distance measuring), and a ceiling distance between the object and the ceiling is measured (hereinafter referred to as ceiling pre-emission distance measuring). Then, the bounce angle is found according to the object distance and the ceiling distance.

There is an image pickup apparatus that photographs while irradiating an object with flash light indirectly when a face registered beforehand is recognized in the bounce emission photographing (see Japanese Laid-Open Patent Publication (Kokai) No. 2012-178666 (JP 2012-178666A)).

Incidentally, when an image pickup apparatus, which is provided with a pre-emission unit that pre-emits for a bounce emission photographing (it is also called a bounce operation) and an AF auxiliary light unit that emits auxiliary light for focusing control, performs a distance measuring operation by emitting the AF auxiliary light unit during the bounce operation, the following problem occurs.

The pre-emission during a charge-storage operation (AF storage operation) of an AF sensor in the distance measuring operation may saturate the AF sensor, which misses the focus in an AF operation. Moreover, if the AF auxiliary light unit emits the auxiliary light during the pre-emission of the lighting device for distance measuring, an error occurs in distance measuring data obtained by the pre-emission. As a result, an error may occur in setting of the bounce angle.

When a timing of the AF storage operation with the AF-auxiliary-light irradiation overlaps with a timing of the pre-emission of the lighting device in the image pickup apparatus disclosed in JP 2012-178666A, the light amount becomes excessively large, which causes an error in the distance measuring. Accordingly, errors occur in the focus setting and the bounce angle setting.

SUMMARY OF THE INVENTION

The present invention provides an image pickup apparatus, a control method therefor, and a storage medium storing a control program therefor, which are capable of focusing correctly and of setting a bounce angle accurately even in a case where a pre-emission unit for a bounce operation and an AF auxiliary light unit for a focusing control are independently provided.

Accordingly, a first aspect of the present invention provides an image pickup apparatus comprising a lighting device that is capable of changing an irradiation angle of an illumination light, an apparatus body that is equipped with the lighting device and outputs an image corresponding to an optical image formed through an image pickup optical system, a first control unit configured to drive the lighting device to perform pre-emission when the irradiation angle is controlled for bounce emission photographing where an object is photographed while being illuminated by a reflected light that is emitted from the lighting device and is reflected by reflection material, a first distance measuring unit configured to measure a first distance between the image pickup apparatus and the object and a second distance between the reflection material and the image pickup apparatus using the pre-emission of the lighting device, a second control unit configured to set up the irradiation angle based on the first distance and the second distance and to drivingly control the lighting device to the set irradiation angle, a second distance measuring unit configured to measure a third distance between the image pickup device and the object during focus control for focusing on the object, and a prohibition unit configured to prohibit the pre-emission by the first control unit when the second distance measuring unit measures the third distance.

Accordingly, a second aspect of the present invention provides a control method for an image pickup apparatus equipped with a lighting device that is capable of changing an irradiation angle of illumination light, and an apparatus body that is equipped with the lighting device and outputs an image corresponding to an optical image formed through an image pickup optical system, the control method comprising a first control step of driving the lighting device to perform pre-emission when the irradiation angle is controlled for bounce emission photographing where an object is photographed while being illuminated by a reflected light that is emitted from the lighting device and is reflected by reflection material, a first distance measuring step of measuring a first distance between the image pickup apparatus and the object and a second distance between the reflection material and the image pickup apparatus using the pre-emission of the lighting device, a second control step of setting up the irradiation angle based on the first distance and the second distance and to drivingly control the lighting device to the set irradiation angle, a second distance measuring step of measuring a third distance between the image pickup device and the object during focus control for focusing on the object, and a prohibition step of prohibiting the pre-emission in the first control step when the third distance is measured in the second distance measuring step.

Accordingly, a third aspect of the present invention provides a non-transitory computer-readable storage medium storing a control program causing a computer to execute the control method of the second aspect.

According to the present invention, since the pre-emission for the bounce drive is prohibited during the focus control, the focusing is performed correctly and the bounce angle that is an irradiation angle is set accurately even in the case where the pre-emission unit for the bounce operation and the AF auxiliary light unit for the focusing control are independently provided.

Further features of the present invention will become apparent from the following description of exemplary embodiments with reference to the attached drawings.

BRIEF DESCRIPTION OF THE DRAWINGS

FIG. 3B is a view showing examples of communication data of the data communication using the second terminal shown in FIG. 1.

FIG. 4 is a flowchart showing an auto-bounce emission photographing process executed by the camera shown in FIG. 1 and FIG. 2.

FIG. 6 is a flowchart showing an information-transmission preparation process shown in FIG. 4.

FIG. 7A is a view showing a list of commands that are used when a camera body obtains data from a strobe (an electric flash) in the camera shown in FIG. 1 and FIG. 2.

FIG. 7B and FIG. 7C are views showing lists of commands that are used when the camera body transmits data to the strobe in the camera shown in FIG. 1 and FIG. 2.

FIG. 10A and FIG. 10B are flowcharts respectively showing processes in the camera body and the strobe in an auto-bounce data obtaining process shown in FIG. 9.

FIG. 15 is a view showing an example of a scene of the bounce emission photographing performed with the camera shown in FIG. 1 and FIG. 2.

FIG. 16B is a flowchart showing a process performed with the strobe in the bounce drive control process shown in FIG. 9.

FIG. 18 is a flowchart showing an auto bounce emission photographing process performed with a camera according to a second embodiment of the present invention.

FIG. 19 is a flowchart showing a bounce process performed with the camera according to the second embodiment of the present invention.

FIG. 20B is a view showing another example of the pre-emission prohibition period set in the camera according to the second embodiment of the present invention.

FIG. 21 is a flowchart showing a bounce process performed with a camera according to a third embodiment of the present invention.

DESCRIPTION OF THE EMBODIMENTS

Hereafter, embodiments according to the present invention will be described in detail with reference to the drawings.

Figure 1:
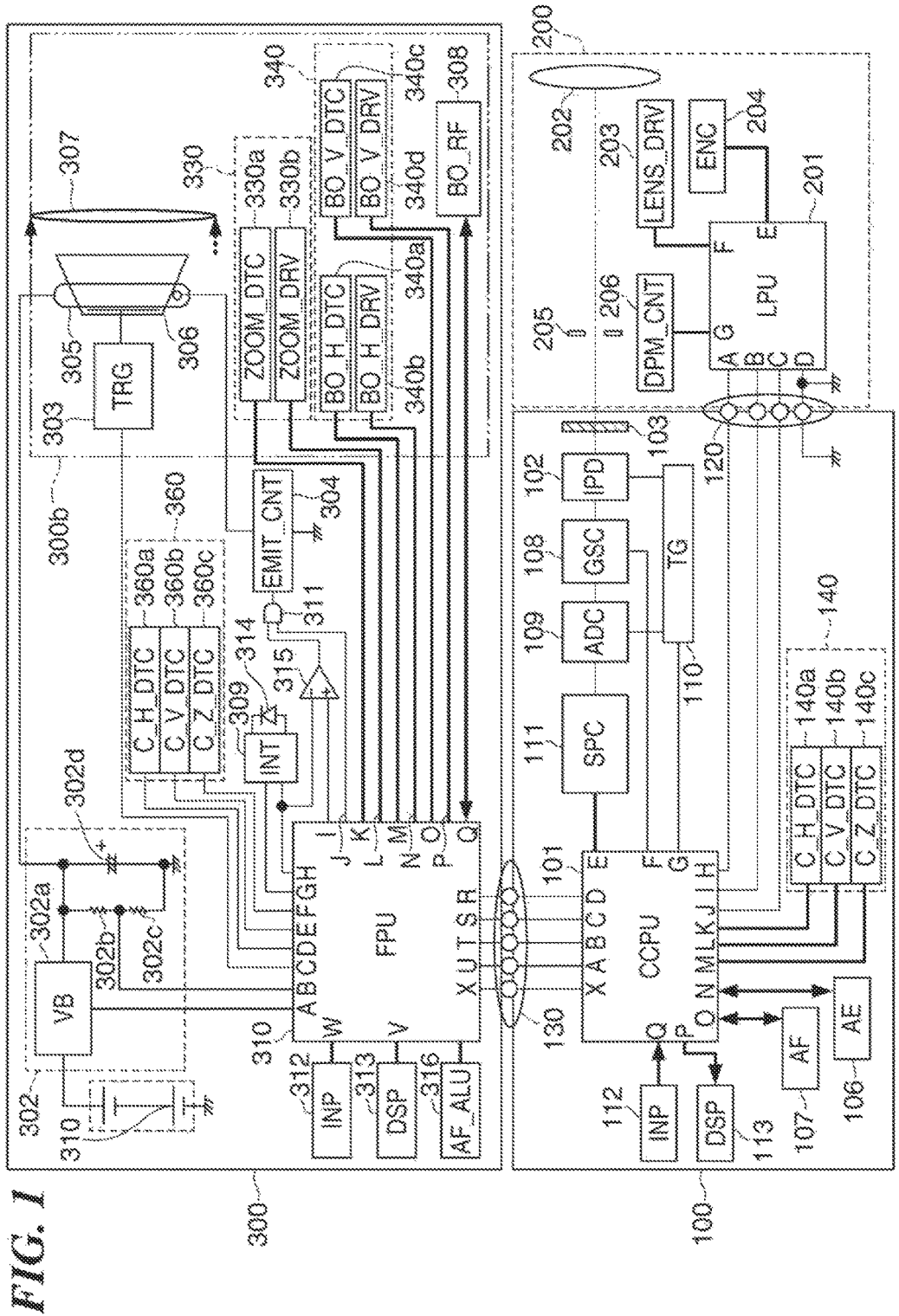
FIG. 1 is a block diagram schematically showing a configuration of an image pickup apparatus (a camera) according to a first embodiment of the present invention.

FIG. 1 is a block diagram schematically showing a configuration of an image pickup apparatus according to a first embodiment of the present invention.

Figure 2:
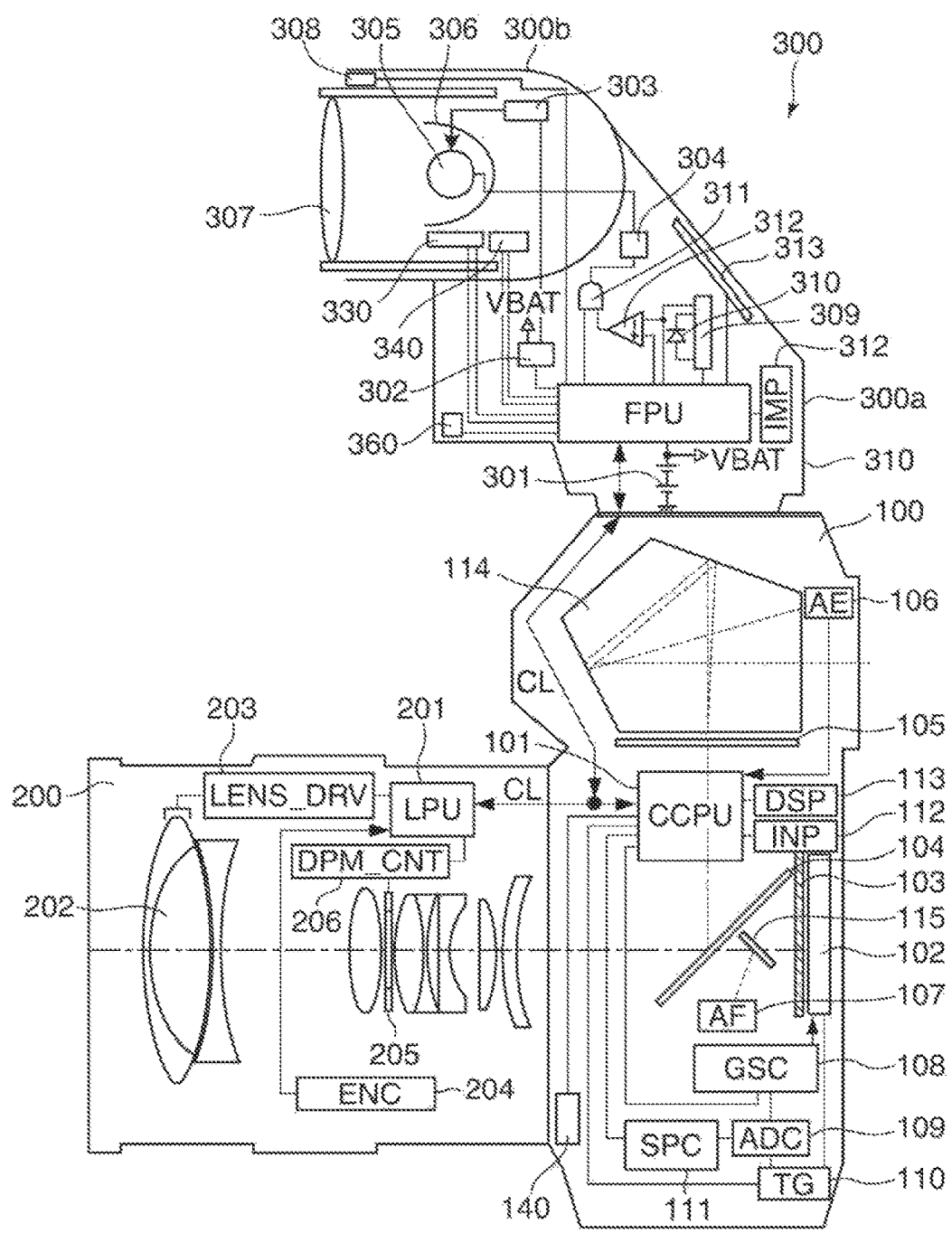
FIG. 2 is a view schematically showing the image pickup apparatus according to the first embodiment of the present invention in a broken state.

FIG. 2 is a view schematically showing the image pickup apparatus according to the first embodiment of the present invention in a broken state.

The image pickup apparatus shown in FIG. 1 and FIG. 2 is a digital camera (hereinafter referred to as a camera, simply) that has a camera body (an image pickup apparatus body) 100. Then, the camera body 100 is equipped with a photographing lens unit (hereinafter referred to as a lens unit, simply) 200 detachably. That is, the lens unit 200 is attachable to the camera body 100.

Moreover, the camera body 100 is equipped with a strobe (an electronic flash) 300 that is a lighting device so that attachment and detachment are possible. That is, the strobe 300 is attachable to the camera body 100. Then, the camera body 100 is able to communicate with the lens unit 200 and the strobe 300 as mentioned later. The camera body 100 outputs an image corresponding to an optical image (object image) formed through the lens unit 200 that is an image pickup optical system.

The camera body 100 is provided with a microcomputer (camera microcomputer: CCPU) 101, and the camera microcomputer 101 controls the entire camera body 100. The camera microcomputer 101 is a one-chip IC circuit including a CPU, ROM, RAM, input-output control circuit (I/O control circuit), multiplexer, timer circuit, EEPROM, A/D converter, D/A converter, etc., for example. Then, the camera microcomputer 101 controls the camera using software.

An image pickup device (IPD) 102 is a CCD or a CMOS sensor including an infrared cut filter, low pass filter, etc., for example. An object image (optical image) is formed on the image pickup device 102 through a lens group 202 mentioned later. A shutter 103 is arranged in front of the image pickup device 102. The shutter 103 is movable between a position (shading position) to shield the image pickup device 102 and a position (exposure position) to exposes the image pickup device 102.

A main mirror (half mirror) 104 is movable between a position (first position) to reflect a part of light entering through the lens group 202 to form an image on a focusing screen 105 and a position (second position) to be retracted from an optical axis (photographing light path) of the lens group 202. The object image is formed on the focusing screen 105 by means of the main mirror 104. Then, a user is able to check the object image formed on the focusing screen 105 through an optical finder (not shown).

A photometry unit (AE) 106 is provided with a photometry sensor, divides the object image into a plurality of areas, and measures light intensity in each of the areas. It should be noted that the photometry sensor takes in the object image formed on the focusing screen 105 through a pentagonal prism 114. The photometry unit 106 is connected to an AE_CNT terminal N of the camera microcomputer 101.

A focusing-purpose distance measuring unit (AF) 107 is provided with a distance measuring sensor (a range finding sensor) that has a plurality of distance measuring points, and outputs the focus information showing a defocus amount in each of the distance measuring points, etc. This focus information is used for focusing a lens group (a focusing lens). The focusing-purpose distance measuring unit 107 is connected to an AF_CNT terminal O of the camera microcomputer 101.

A gain switching circuit (GSC) 108 amplifies an image signal (analog signal) output from the image pickup device 102. The gain switching circuit 108 is connected to a GAIN_CONT terminal F of the camera microcomputer 101. The gain switching circuit 108 changes the gain according to an instruction from the camera microcomputer 101 in response to a photographing condition, a user's operation, or the like.

An A/D converter (ADC) 109 converts the image signal (analog signal) amplified by the gain switching circuit 108 into a digital signal (image data). A timing generator (TG) 110 is connected to a TG terminal G of the camera microcomputer 101, and outputs a timing signal for synchronizing the input timing of the image signal (analog signal) amplified by the gain switching circuit 108 and the A/D conversion timing of the A/D converter 109. A signal processing circuit (SPC) 111 applies a predetermined signal process to the image data output from the A/D converter 109, and inputs the processed image data into an I_CONT terminal E of the camera microcomputer 101.

A communication line CL (FIG. 2) is an interface signal line between the camera body 100, the lens unit 200, and the strobe 300. For example, information communications, such as exchange of data and transfer of a command, are mutually performed through the communication-line CL while the camera microcomputer 101 acts as a host.

FIG. 1 shows serial communications using a first terminal 120 and a second terminal 130 as an example of the communication line CL.

An input unit (INP) 112 includes operation members, such as a power switch, a release button, and a setting button, and is connected to an SW_CNT terminal Q of the camera microcomputer 101. The camera microcomputer 101 performs various processes according to an input operation through the input unit 112.

When the release button is operated by a first step (half press), a first switch SW1 turns ON, and the camera microcomputer 101 starts photographing preparation operations, such as focusing and photometry. When the release button is operated by a second step (full press), a second switch SW2 turns ON, and the camera microcomputer 101 starts photographing operations, such as exposure and a development process.

Moreover, a user adjusts various settings about the strobe 300 attached to the camera body 100 by operating setting buttons etc. of the input unit 112. A display unit 113 that has an LCD device and a light emitting element is connected to a DP_CNT terminal P of the camera microcomputer 101, and displays a set-up mode and another photographing information etc.

The pentagonal prism 114 guides the object image on the focusing screen 105 to the photometry sensor of the photometry unit 106 and to the optical finder. A sub mirror 115 guides light that enters through the lens group 202 and passes through the main mirror 104 to the distance measuring sensor of the focusing-purpose distance measuring unit 107.

A posture detection circuit 140 detects posture differences and includes a posture H detection circuit (C_H_DTC) 140a that detects a posture difference in a horizontal direction (a right-left direction), a posture V detection circuit (C_V_DTC) 140b that detects a posture difference in a vertical direction (an up-and-down direction), and a posture Z detection circuit (C_Z_DTC) 140c that detects a posture difference in a front-back direction (Z-direction). The posture H detection circuit 140a, posture V detection circuit 140b, and posture Z detection circuit 140c are respectively connected to a C_H_IN terminal K, C_V_IN terminal L, and C_Z_IN terminal M of the camera microcomputer 101. An angular velocity sensor or a gyro sensor is used for the posture detection circuit 140, for example. The posture information that shows the posture differences in all the directions detected by the posture detection circuit 140 is sent to the camera microcomputer 101.

The lens unit 200 is provided with a microcomputer (lens microcomputer: LPU) 201 that controls the entire lens unit 200. The lens microcomputer 201 is a one-chip IC including a CPU, ROM, RAM, input-output control circuit (I/O control circuit), multiplexer, timer circuit, EEPROM, A/D converter, D/A converter, etc., for example.

The lens group 202 consists of a plurality of lenses including a focusing lens, a zoom lens, etc. It should be noted that the lens group 202 may not be provided with a zoom lens.

A lens driving circuit (LENS_DRV) 203 is a drive system for moving the lens group 202 along with an optical axis. The camera microcomputer 101 finds a drive amount of the lens group 202 on the basis of the output from the focusing-purpose distance measuring unit 107. Then, the camera microcomputer 101 sends the drive amount concerned to the lens microcomputer 201. A lens drive circuit 203 is connected to an L_CNT terminal F of the lens microcomputer 201.

An encoder (ENC) 204 detects the position of the lens group 202, and outputs the drive information that shows the position. The encoder 204 is connected to an L_EN_IN terminal E of the lens microcomputer 201. The lens microcomputer 201 adjusts the focus by controlling the lens drive circuit 203 with reference to the drive information concerned so as to move the lens group 202 by the above-mentioned drive amount. The lens microcomputer 201 controls a diaphragm 205 using a diaphragm control circuit (DPM_CNT) 206 connected to an AV_CNT terminal G.

The strobe 300 has a main part 300a and a moving part 300b as shown in FIG. 2. The main part 300a is detachably attached to the camera body 100. Moreover, the moving part 300b is rotatably supported in the vertical and horizontal directions with respect to the main part 300a. In this case, a rotation direction of the moving part 300b is defined on the assumption that the side of the main part 300a connected with the moving part 300b is an upper side.

The strobe 300 has a microcomputer (a strobe microcomputer: FPU) 310. The strobe microcomputer 310 controls the entire strobe 300. The strobe microcomputer 310 is a one-chip IC including a CPU, ROM, RAM, input-output control circuit (I/O control circuit), multiplexer, timer circuit, EEPROM, A/D converter, D/A converter, etc., for example.

A battery 301 is used as power (VBAT) of the strobe 300. A pressure rise block 302 has a booster circuit (VB) 302a, resistances 302b and 302c used for voltage detection, and a main capacitor 302d. The booster circuit 302a is connected to a CHG_ON terminal A of the strobe microcomputer 310, and raises the voltage of the battery 301 to several hundred voltages to charge electrical energy for an emission to the main capacitor 302d.

The charging voltage of the main capacitor 302d is divided by the resistances 302b and 302c. The divided voltage concerned is input into an A/D conversion terminal (MCV_AD) B of the strobe microcomputer 310. A trigger circuit (TRG) 303 is connected to a TRIG terminal C of the strobe microcomputer 310, and applies pulse voltage to a discharge tube 305 mentioned later for exciting the discharge tube 305.

An emission control circuit (EMIT_CNT) 304 controls start and stop of emission of the discharge tube 305. The discharge tube 305 is excited in response to the pulse voltage of several kilovolts applied from the trigger circuit 303, and emits light using electrical energy charged in the main capacitor 302d.

A bounce-purpose distance measuring (range finding) unit (BO_RF) 308 detects a distance to a target (i.e., an object) by a known method. For example, the bounce-purpose distance measuring unit 308 is provided with a photosensor, and detects the distance to the object by receiving light reflected by the target that exists in the irradiation direction of the discharge tube 305 by the photosensor. Alternatively, the bounce-purpose distance measuring unit 308 detects the distance to the target by receiving light reflected by the target that exists in the irradiation direction of the AF auxiliary light unit 316 by the photosensor. The bounce-purpose distance measuring unit 308 is connected to an F_AF_CONT terminal Q of the strobe microcomputer 310.

A photo diode 314 is one of the photosensors that receive light from the discharge tube 305 directly or through a glass fiber. An integrating circuit (INT) 309 integrates light receiving current of the photo diode 314. The integrated output of the integrating circuit 309 is input to an inverting input terminal of a comparator 315 and to an A/D converter terminal (INT_AD) H of the strobe microcomputer 310. Moreover, the integrating circuit 309 is connected to an INT_ST terminal G of the strobe microcomputer 310, and starts integration on the basis of a command from the strobe microcomputer 310. The non-inverting input terminal of the comparator 315 is connected to a D/A converter terminal (INT_DAC) I of the strobe microcomputer 310. The output of the comparator 315 is connected to one input terminal of an AND gate 311.

The other input terminal of the AND gate 311 is connected to an emission-control terminal (FL_START) J of the strobe microcomputer 310. The output of the AND gate 311 is input into the emission control circuit 304. A reflection umbrella 306 reflects the light from the discharge tube 305 and guides it in a predetermined direction.

A zoom optical system 307 including an optical panel etc. is supported so that a relative position to the discharge tube 305 is changeable. Guide number and an irradiation range of the strobe 300 are changed by changing the relative position between the discharge tube 305 and the zoom optical system 307.

A light emitting section of the strobe 300 consists of the discharge tube 305, the reflection umbrella 306, and the zoom optical system 307, for example. The irradiation range of the light emitting section varies according to the movement of the zoom optical system 307. The irradiation direction of the light emitting section varies according to rotation of the moving part 300b. That is, the moving part 300b is able to change a bounce angle (an irradiation angle).

An input unit (INP) 312 includes operation members, such as a power switch, a mode setting switch to set up an operation mode of the strobe 300, and setting buttons to set up various parameters, and is connected to a SW_CNT terminal W of the strobe microcomputer 310. The strobe microcomputer 310 performs various processes according to an input operation through the input unit 312.

A display unit (DSP) 313 that has an LCD device and a light emitting element is connected to a DP_CNT terminal V of the strobe microcomputer 310, and displays a state of the strobe 300. An AF auxiliary light unit (AF_ALU) 316 emits auxiliary light so that the focusing-purpose distance measuring unit 107 performs a focus detecting operation even in a dark place.

A zoom actuator 330 has a zoom detection circuit (ZOOM_DCT) 330a and a zoom drive circuit (ZOOM_DRV) 330b. The zoom detection circuit 330a detects information about the relative position between the discharge tube 305 and the zoom optical system 307 using an encoder etc. Moreover, the zoom drive circuit 330b has a motor for moving the zoom optical system 307. The zoom detection circuit 330a and the zoom drive circuit 330b are respectively connected to a ZOOM_AD terminal K and a ZOOM_ON terminal L of the strobe microcomputer 310.

The camera microcomputer 101 sends focal length information output from the lens microcomputer 201 to the strobe microcomputer 310. Then, the strobe microcomputer 310 computes a drive amount of the zoom optical system 307 on the basis of the focal length information.

A bounce circuit 340 has a bounce H detection circuit (BO_H_DTC) 340a, bounce H drive circuit (BO_H_DRV) 340b, bounce V detection circuit (BO_V_DTC) 340c, and bounce V drive circuit (BO_V_DRV) 340d. The bounce H detection circuit 340a and the bounce V detection circuit 340c detect the drive amounts of the moving part 300b (rotational angles of the moving part 300b with respect to the main part 300a). The bounce H drive circuit 340b and the bounce V drive circuit 340d rotate the moving part 300b. The bounce H detection circuit 340a, bounce H drive circuit 340b, bounce V detection circuit 340c, and bounce V drive circuit 340d are respectively connected to a BO_H_IN terminal M, BO_H_ON terminal N, BO_V_IN terminal O, and BO_V_ON terminal P of the strobe microcomputer 310.

The bounce H detection circuit 340a detects a horizontal drive amount of the moving part 300b with a rotary encoder or an absolute encoder. The bounce V detection circuit 340c detects a vertical drive amount of the moving part 300b with a rotary encoder or an absolute encoder.

The bounce H drive circuit 340b drives the moving part 300b in the horizontal direction with a motor. The bounce V drive circuit 340d drives the moving part 300b in the vertical direction with a motor.

The posture detection circuit 360 detects posture differences, and has a posture H detection circuit (C_H_DTC) 360a, posture V detection circuit (C_V_DTC) 360b, and posture Z detection circuit (C_Z_DTC) 360c. The posture H detection circuit 360a, posture V detection circuit 360b, and posture Z detection circuit 360c are respectively connected to a C_H_IN terminal D, C_V_IN terminal E, and C_Z_IN terminal F of the strobe microcomputer 310. The posture H detection circuit 360a detects a posture difference in the horizontal direction. The posture V detection circuit 360b detects a posture difference in the vertical direction. Moreover, the posture Z detection circuit 360c detects a posture difference in a front-back direction (Z direction). An angular velocity sensor or a gyro sensor is used for the posture detection circuit 360, for example.

The first terminal 120 connects an SCLK_L terminal H of the camera microcomputer 101 with an SCLK_L terminal A of the lens microcomputer 201 in order to synchronize communications between the camera microcomputer 101 of the camera body 100 and the lens microcomputer 201 of the lens unit 200. The first terminal 120 connects a MOSI_L terminal I of the camera microcomputer 101 with a MOSI_L terminal B of the lens microcomputer 201 in order to transmit data to the lens microcomputer 201 from the camera microcomputer 101. Moreover, the first terminal 120 connects a MISO_L terminal J of the camera microcomputer 101 with a MISI_L terminal C of the lens microcomputer 201 in order to transmit data to the camera microcomputer 101 from the lens microcomputer 201, and connects a GND terminal D of the camera microcomputer 101 with a GND terminal D of the lens microcomputer 201.

The second terminal 130 connects an SCLK_S terminal A of the camera microcomputer 101 with an SCLK_S terminal U of the strobe microcomputer 310 in order to synchronize communications between the camera microcomputer 101 of the camera body 100 and the strobe microcomputer 310 of the strobe 300, The second terminal 130 connects a MOSI_S terminal B of the camera microcomputer 101 with a MOSI_S terminal T of the strobe microcomputer 310 in order to transmit data to the strobe microcomputer 310 from the camera microcomputer 101. The second terminal 130 connects a MOSI_S terminal C of the camera microcomputer 101 with a MOSI_S terminal S of the strobe microcomputer 310 in order to transmit data to the camera microcomputer 101 from the strobe microcomputer 310. Moreover, the second terminal 130 connects the GND terminal D of the camera microcomputer 101 with a GND terminal R of the strobe microcomputer 310, and connects a terminal X of the camera microcomputer 101 with a terminal X of the strobe microcomputer 310.

Figure 3A:
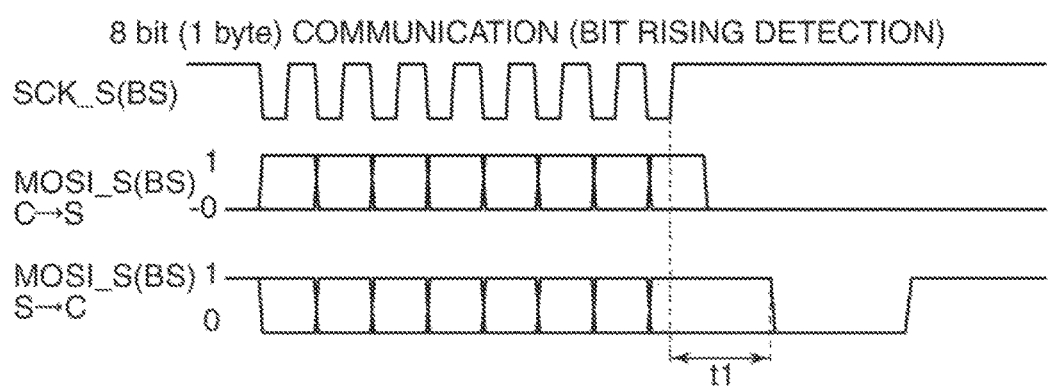
FIG. 3A is a view showing timings of a data communication using a second terminal shown in FIG. 1.

FIG. 3A and FIG. 3B are views showing examples of data communications using the second terminal 130 shown in FIG. 1. Then, FIG. 3A is a view showing timings of a data communication, and FIG. 3B is a view showing examples of communication data.

When transmitting data to the strobe microcomputer 310 from the camera microcomputer 101, the camera microcomputer 101 transmits data serially from the MOSI_S terminal in synchronization with eight bit clock from the SCK_S terminal. Moreover, when transmitting data to the camera microcomputer 101 from the strobe microcomputer 310, the camera microcomputer 101 receives data serially from the MISO_S terminal in synchronization with eight bit clock from the SCK_S terminal.

The signals are read and written at rises of the SCLK_S signal in 8-bit (1 byte) communications in the example shown in FIG. 3A. That is, a command, command data, and data are transmitted continuously by repeating the 8-bit communication.

Moreover, the camera microcomputer 101 transmits data shown in FIG. 3B to the strobe microcomputer 310 on the basis of the below-mentioned command list. For example, when "AUTO BOUNCE SET/RELEASE" is transmitted to the strobe 300 from the camera body 100, the camera microcomputer 101 transmits the CS communication (camera-strobe communication) "80H" as a first byte, the command number "011 (0BH)" as a second byte, and the data (content) "01" (setting) as a third byte after converting a hexadecimal number into a binary number.

When transmitting data to the strobe 300 from the camera body 100, the camera microcomputer 101 transmits the command CS: 80H as the first byte. When the camera body 100 obtains data from the strobe 300, a command SC: 01H is transmitted to the strobe 300 from the camera body 100 as the first byte.

A command number (converted into a hexadecimal number at the time of transmission) that follows the SC (strobe-camera communication) or the CS is set to the second byte. Setting item data is set to the third and fourth bytes. Then, the second, third, and fourth bytes are transmitted to one of the camera body 100 and the strobe 300 from the other.

It should be noted that another data communications will be described later. Moreover, the commands, such as an AF auxiliary light emission instruction mentioned later, that are other than the above-mentioned serial communications and are transmitted to the strobe 300 from the camera body 100 shall be included in the SC.

FIG. 4 is a flowchart showing an auto-bounce emission photographing process executed by the camera shown in FIG. 1 and FIG. 2.

When the power switch of the input unit 112 is turned ON, the camera microcomputer 101 initializes an internal memory and ports (step S1). At this time, the camera microcomputer 101 reads the states of the various switches of the input unit 112 and preset input information, and sets up a photographing mode that defines how to determine shutter speed and an aperture value etc.

Subsequently, the camera microcomputer 101 determines whether the first switch SW1 is ON by operating the release button of the input unit 112 (step S2). When the first switch SW1 is OFF (NO in the step S2), the camera microcomputer 101 waits.

On the other hand, when the first switch SW1 is turned ON (YES in the step S2), the camera microcomputer 101 communicates with the lens microcomputer 201 through the communication line CL. Then, the camera microcomputer 101 obtains focal length information from the lens unit 200, and obtains optical information required for focusing and photometry (step S3).

Next, the camera microcomputer 101 determines whether the strobe 30 is attached to the camera body 100 (step S4). When the strobe 300 is attached to the camera body 100 (YES in the step S4), the camera microcomputer 101 communicates with the strobe microcomputer 310 through the communication line CL, and obtains the strobe information, such as a strobe ID and charging information showing a charge state of the main capacitor 302d, from the strobe microcomputer 310 (step S5). Furthermore, the camera microcomputer 101 sends the focal length information obtained by the process in the step S3 to the strobe microcomputer 310.

As the result of this, the strobe microcomputer 310 computes a drive amount of the zoom optical system 307 on the basis of the focal length information. Then, the strobe microcomputer 310 moves the zoom optical system 307 on the basis of the drive amount concerned so as to change the irradiation range of the strobe 300 to the range corresponding to the focal length.

Subsequently, the camera microcomputer 101 prepares transmission of the information about the strobe 300 (strobe information) input through the input unit 112 to the strobe microcomputer 310 (step S6). In this step, the camera microcomputer 101 converts the strobe information input through the input unit 112 into the corresponding command. It should be noted that details of the process in the step S6 will be described later.

Next, the camera microcomputer 101 transmits the strobe information obtained by the information transmitting preparation to the strobe 300 (step S7). It should be noted that details of the process in the step S7 will be described later. Then, the camera microcomputer 101 determines whether an operation for automatically determining an irradiation direction at a time of bounce emission photographing (referred to as an auto bounce operation) is performed (step S11). The camera microcomputer 101 determines whether the auto bounce operation is performed on the basis of a state of an auto bounce switch that is provided in the input unit 112 or the input unit 312. The camera microcomputer 101 may determine whether the auto bounce operation is performed on the basis of the situation of the camera body 100 etc.

When determining that the auto bounce operation is not performed (NO in the step S11), the camera microcomputer 101 proceeds with the process to step S16 mentioned later. On the other hand, when determining that the auto bounce operation is performed (YES in the step S11), the camera microcomputer 101 performs a process about the auto bounce operation (hereinafter referred to as a bounce process) as mentioned later (step S12).

After performing the bounce process, the camera microcomputer 101 determines whether an error occurred in the bounce process (step S13). When no error occurred in the bounce process (NO in the step S13), the camera microcomputer 101 proceeds with the process to the step S16 mentioned later.

When an error occurs in the bounce process, the strobe microcomputer 310 sends the error information showing that the error occurs to the camera microcomputer 101 in the bounce process. When an error occurs in the bounce process (YES in the step S13), the camera microcomputer 101 displays a warning showing that the error occurred in the bounce process on the display unit 113 (step S14).

The camera microcomputer 101 may display the warning on the display unit 313 of the strobe 300 by communicating with the strobe microcomputer 310.

Subsequently, the camera microcomputer 101 performs a switching process that switches to the setting about photographing to a non-emission setting in which the emission photographing is not performed (step S15). Then, the camera microcomputer 101 proceeds with the process to the below-mentioned step S16.

When the strobe 300 is not attached to the camera body 100 (NO in the step S4), the camera microcomputer 101 determines whether the set-up focusing (focus control) mode is an AF (Autofocus) mode (step S8). When the focusing mode is the AF mode (YES in the step S8), the camera microcomputer 101 detects focus by the known phase difference detection method with the focusing-purpose distance measuring unit 107 (step S9).

In this case, the camera microcomputer 101 selects a distance measuring point to be focused from among a plurality of distance measuring points. For example, a distance measuring point is selected by giving priority to a nearer point. Furthermore, a distance measuring point may be selected according to a user's operation through the input unit 112. Then, the camera microcomputer 101 once stores the distance measuring point in an in-focus state into a built-in RAM, and transmits the distance measuring point concerned as a command to the strobe microcomputer 310 at the time of the auto bounce operation.

Subsequently, the camera microcomputer 101 computes the drive amount of the lens group 202 on the basis of the focus information obtained from the focusing-purpose distance measuring unit 107. Then, the camera microcomputer 101 communicates with the lens microcomputer 201 through the communication line CL, and moves the lens group 202 on the basis of the drive amount concerned (step S10).

Next, the camera microcomputer 101 performs photometry with the photometry unit 106, and obtains a photometry result (step S16). For example, when the photometry sensors of the photometry unit 106 respectively measure the light intensities in the six-divided areas, the camera microcomputer 101 stores the object luminance value EVb(i) in each of the six areas as the photometry result into the built-in RAM. In this place, "i" is an integer from 0 to 5.

When the focusing mode is an MF (Manual Focus) mode (NO in the step S8), the camera microcomputer 101 proceeds with the process to the presses in the step S16.

Subsequently, the camera microcomputer 101 switches the gain with the gain switching circuit 108 (step S17). In this place, the camera microcomputer 101 switches the gain according to the gain setting set through the input unit 112. The gain setting concerned means ISO speed setting, for example. Furthermore, the camera microcomputer 101 communicates with the strobe microcomputer 310 through the communication line CL, and sends the gain setting information showing the post-switching gain to the strobe microcomputer 310, for example.

Next, the camera microcomputer 101 performs exposure calculation on the basis of the photometry result (the luminance value of each of the areas stored in the built-in RAM) obtained by the process in the step S16, and determines an exposure value EVs (step S18). Then, the camera microcomputer 101 determines whether a charging completion signal is received from the strobe microcomputer 310 (step S19).

When receiving the charging completion signal from the strobe microcomputer 310 (YES in the step S19), the camera microcomputer 101 determines the exposure control values (the shutter speed Tv and aperture value Av) that are suitable for the emission photographing on the basis of the exposure value determined by the process in the step S18 (step S20). On the other hand, when the charging completion signal is not received from the strobe microcomputer 310 (NO in the step S19), the camera microcomputer 101 determines the exposure control values that are suitable for the photographing without emitting the strobe 300 (non-emission photographing) on the basis of the exposure value determined by the process in the step S18 (step S21).

After the process in the step S20 or step S21, the camera microcomputer 101 determines whether the second switch SW2 is ON by operating the release button of the input unit 112 (step S22). When the second switch SW2 is OFF (NO in the step S22), the camera microcomputer 101 returns the process to the step S2. On the other hand, when the second switch SW2 turns ON (YES in the step S22), the camera microcomputer 101 shifts to an emission photographing process.

Figure 5:
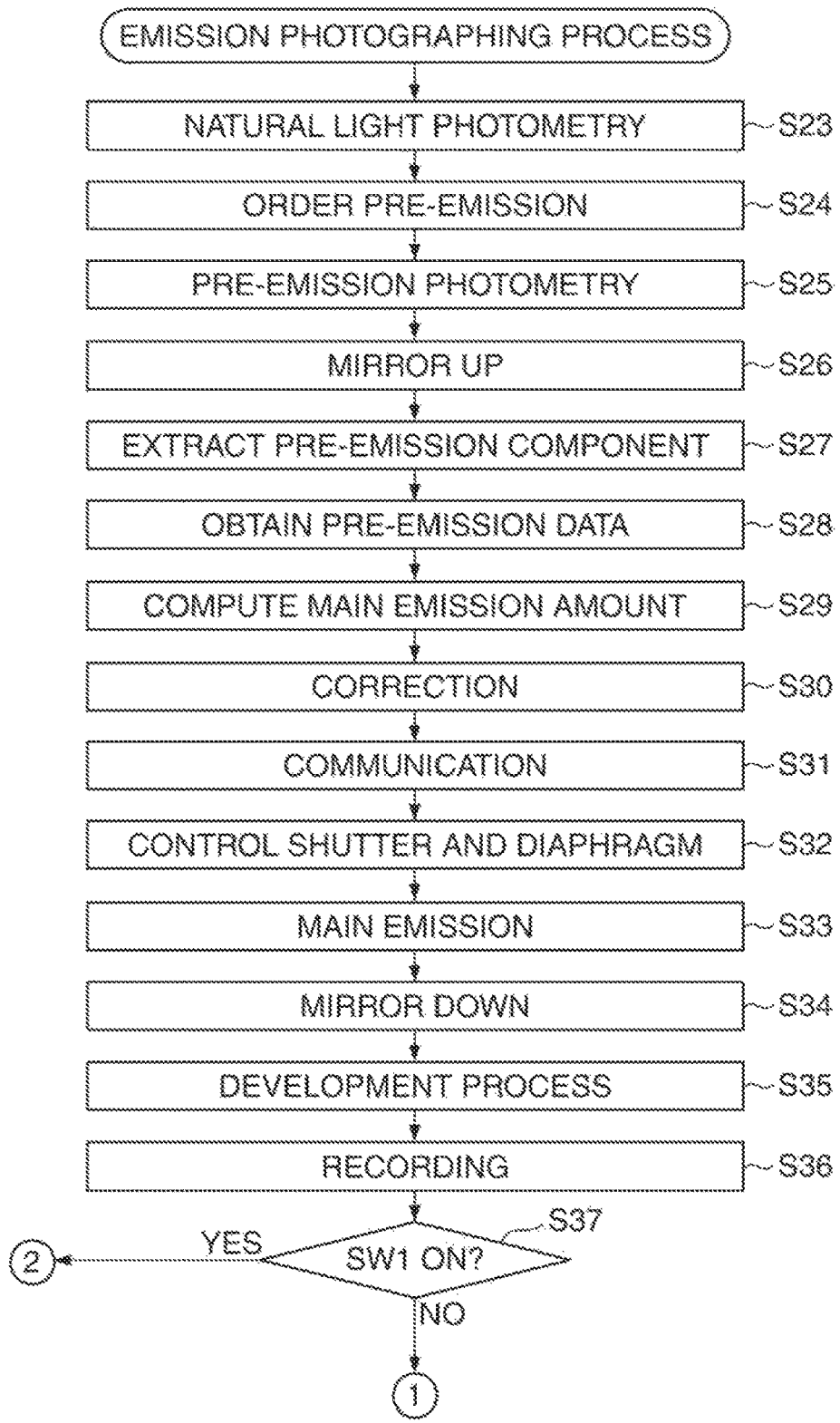
FIG. 5 is a flowchart showing an emission photographing process executed by the camera shown in FIG. 1 and FIG. 2.

FIG. 5 is a flowchart showing the emission photographing process executed by the camera shown in FIG. 1 and FIG. 2. It should be noted that a non-emission photographing process can be described by removing a process for main emission from the flowchart shown in FIG. 5.

When the emission photographing process is started, the camera microcomputer 101 performs photometry with the photometry unit 106 in a state where the strobe 300 does not emit light (step S23: natural light photometry). Then, the camera microcomputer 101 obtains the photometry result of the natural light photometry (a non-emission luminance value) from the photometry unit 106, and stores the non-emission luminance value EVa(i) of each area into the built-in RAM.

Subsequently, the camera microcomputer 101 orders a pre-emission for the strobe microcomputer 310 through the communication line CL (step S24). In response to this order, the strobe microcomputer 310 controls the trigger circuit 303 and the emission control circuit 304, and causes the pre-emission with a predetermined light amount.

Next, the camera microcomputer 101 performs photometry in the pre-emission state with the photometry unit 106 (step S25: pre-emission photometry). Then, the camera microcomputer 101 obtains the photometry result at the time of the pre-emission (a pre-emission luminance value) from the photometry unit 106. The camera microcomputer 101 stores the pre-emission luminance value EVf(i) of each area that is the photometry result into the built-in RAM.

Subsequently, the camera microcomputer 101 raises up the main mirror 104 before the exposure so that the main mirror 104 is retracted from the photographing light path (step S26). Then, the camera microcomputer 101 extracts a luminance value EVdf(i) of only the pre-emission reflected light component according to the following formula (1) using the non-emission luminance value EVa(i) and the pre-emission luminance value EVf(i) (step S27). It should be noted that this extraction is performed for every six areas.

$$EVdf(i) = LN2(2^{EVf(i)} - 2^{EVa(i)}) \quad (1)$$

Next, the camera microcomputer 101 obtains pre-emission data Qpre showing the emission amount of the pre-emission from the strobe microcomputer 310 through communication line CL (step S28). Then, the camera microcomputer 101 selects one area in which an object is subjected to the calculation of the proper emission amount from among the six areas, and calculates the main emission amount according to the distance measuring point, the focal length information, the pre-emission data Qpre, and a bounce communication content (step S29).

When finding the main emission amount, the camera microcomputer 101 a relative ratio r of the proper main emission amount to the pre-emission amount about the object in the selected area (P) on the basis of the exposure value EVs, the object luminance value EVb(p), and the luminance value EVdf(p) of only the pre-emission reflected light component, using the following formula (2).

$$r = LN2(2^{EVs} - 2^{EVb(p)}) - EVdf(p) \quad (2)$$

In this case, the difference is found by subtracting the object luminance value EVb(p) from the exposure value EVs in order to control the main emission amount so that the exposure at the time of the main emission becomes proper by adding the strobe light (illumination light) to the natural light.

Subsequently, the camera microcomputer 101 corrects the relative ratio r on the basis of the shutter speed Tv at the time of emission photographing, the emission time t_pre of the pre-emission, and a correction coefficient c preset through the input unit 11, using the following formula (3) (step S30).

$$r1 = r + Tv - t\_pre + c \quad (3)$$

In this case, the reason why the shutter speed Tv and the emission time t_pre of the pre-emission are used for the correction is to correctly compare a photometry integration value of the pre-emission with a photometry integration value of the main emission.

Subsequently, the camera microcomputer 101 sends the information about the relative ratio r for determining the main emission amount to the strobe microcomputer 310 through the communication line CL (step S31). Then, the camera microcomputer 101 issues a command to the lens microcomputer 201 so as to achieve the aperture value Av determined by the process in the step S20 shown in FIG. 4. Furthermore, the camera microcomputer 101 controls the shutter 103 so as to operate at the determined shutter speed Tv (step S32).

Next, the camera microcomputer 101 orders the main emission for the strobe microcomputer 310 through the communication line CL. As a result of this, the strobe microcomputer 310 finds the main emission amount on the basis of the above-mentioned relative ratio r1, and performs the main emission by the main emission amount concerned (step S33).

When a series of the exposure operations are completed as mentioned above, the camera microcomputer 101 returns the main mirror 104 down so that the main mirror 104 is positioned in the photographing light path again (step S34).

Subsequently, the camera microcomputer 101 amplifies the image signal output from the image pickup device 102 by the gain set up by the gain switching circuit 108, and then, converts the amplified image signal into a digital signal (image data) with the A/D converter 109. Then, the camera microcomputer 101 applies a predetermined signal process, such as a white balance process, to the image data with the signal processing circuit 111 (step S35: a development process).

After that, the camera microcomputer 101 records the image data to which the predetermined signal process was applied into a memory (not shown), and finishes the series of the photographing procedures (step S36). Then, the camera microcomputer 101 determines whether the first switch SW1 is in an ON state (step S37). When the first switch SW1 is in the ON state (YES in the step S37), the camera microcomputer 101 shifts the process to the step S22 shown in FIG. 4. On the other hand, when the first switch SW1 is in an OFF state (NO in the step S37), the camera microcomputer 101 shifts the process to the step S2 shown in FIG. 4.

Next, the information transmitting preparation process performed in the step S6 in FIG. 4 will be described. FIG. 6 is a flowchart showing the information transmitting preparation process.

When the information transmitting preparation process is started, the camera microcomputer 101 determines whether the camera is able to perform the auto bounce operation (an auto-bounce-capable camera) (step S501).

In the information transmitting preparation process, the camera body 100 and the strobe 300 communicate using commands. FIG. 7A is a view showing a list of commands (SC) that are used when the camera body 100 obtains data from the strobe 300. Moreover, FIG. 7B and FIG. 7C are views showing lists of commands (CS) that are used when the camera body 100 transmits an instruction, data, etc., to the strobe 300.

When the camera is an auto-bounce-capable camera (YES in the step S501), the camera microcomputer 101 stores CS001 command: 01" into the built-in RAM as preparation of a camera-to-strobe communication (CS) (step S502). On the other hand, when the camera is not an auto-bounce-capable camera (NO in the step S501), the camera microcomputer 101 stores "CS001 command: 00" into the built-in RAM as preparation of a camera-strobe communication (CS) (step S503).

After the process in the step S502 or S503, the camera microcomputer 101 determines whether a setting for an auto bounce operation (auto bounce setting) is performed (step S504). When the auto bounce setting is performed (SET in the step S504), the camera microcomputer 101 stores "CS011 command: 01" into the built-in RAM as preparation of a camera-to-strobe communication (CS) (step S505). On the other hand, when the auto bounce setting is released (RELEASE in the step S504), the camera microcomputer 101 stores "CS011 command: 00" into the built-in RAM as preparation of the camera-to-strobe communication (CS) (step S506).

After the process in the step S505 or S506, the camera microcomputer 101 determines whether a distance measuring method that finds a distance to a target that is information for determining the irradiation direction suitable for the bounce emission photographing is set up in the camera body 100 (step S507). In this case, the target means an object photographed and a reflection material (ceiling or wall) that reflects strobe light at the time of bounce emission photographing.

The distance measuring method includes a strobe pre-emission distance measuring method (hereinafter referred to as a pre-emission method) that pre-emits the strobe and measures a distance to a target on the basis of an amount of light reflected by the target, for example. Moreover, there is a strobe non-emission distance measuring method (hereinafter referred to as a strobe distance measuring system) that measures a distance to a target without emitting the strobe using the bounce-purpose distance measuring unit 308 of the strobe 300. In addition, there is a camera distance measuring method that measures a distance to a target using the result of the focusing of the lens unit 200. Other distance measuring methods may be employed.

When the distance measuring method is set up (SET in the step S507), the camera microcomputer 101 stores "CS091 command: XX XX" of which data is set according to the setting content of the distance measuring method into the built-in RAM as preparation of a camera-to-strobe communication (CS) (step S508). For example, the camera microcomputer 101 allocates a distinction between an "object (photographing target)" and a "ceiling" to high 4 bits of the data, and allocates a distinction between the "pre-emission method", "strobe distance measuring method", and "camera distance measuring method" to low 4 bits of the data.

When the "pre-emission method" is set for both of the object and ceiling that are targets, the camera microcomputer 101 stores "CS091 command: data 00 10" into the built-in RAM. Similarly, when the "strobe distance measuring method" is set for both the object and ceiling that are the targets, the camera microcomputer 101 stores "CS091 command: data 01 11" into the built-in RAM. Moreover, when the "camera distance measuring method" is set for the object and the "pre-emission method" is set for the ceiling, the camera microcomputer 101 stores "CS091 command: data 02 10" into the built-in RAM.

Subsequently, the camera microcomputer 101 determines the state of the release button (step S509). When the distance measuring method is not set up (NO SET in the step S507), the camera microcomputer 101 proceeds with the process to the step S509.

When both the first switch SW1 and second switch SW2 are OFF in the state determination of the release button (SW1, SW2 OFF in the step S509), the camera microcomputer 101 stores "CS151 command: data 00" into the built-in RAM (step S510).

When only the first switch SW1 is ON in the state determination of the release button (SW1 ON in the step S509), the camera microcomputer 101 stores "CS151 command: data 01" into the built-in RAM (step S511). Moreover, when the second switch SW2 is ON (SW2 ON in the step S509), the camera microcomputer 101 stores "CS151 command: data 02" into the built-in RAM (step S512).

After the process in the step S510, S511, or S512, the camera microcomputer 101 determines whether a photometry timer is in operation (step S513). The photometry timer measures a predetermined photometry period in order to change an operation mode to a power saving mode after performing photometry in the predetermined photometry period. The photometry timer is in operation in the predetermined photometry period.

The photometry timer is included in the camera microcomputer 101. The camera microcomputer 101 starts the operation of the photometry timer in synchronization with ON of the first switch SW1, for example.

When the photometry timer is in operation (YES in the step S513), the camera microcomputer 101 stores "CS141 command: data 01" into the built-in RAM as preparation of the camera-strobe communication (CS) (step S514). On the other hand, when the photometry timer is not in operation (NO in the step S513), the camera microcomputer 101 stores "CS141 command: data 00" into the built-in RAM as preparation of the camera-strobe communication (CS) (step S515).

After the process in the step S514 or S515, the camera microcomputer 101 stores other strobe setting information into the built-in RAM (step S516). Then, the camera microcomputer 101 shifts the process to the step S7 shown in FIG. 4.

Figure 8A:
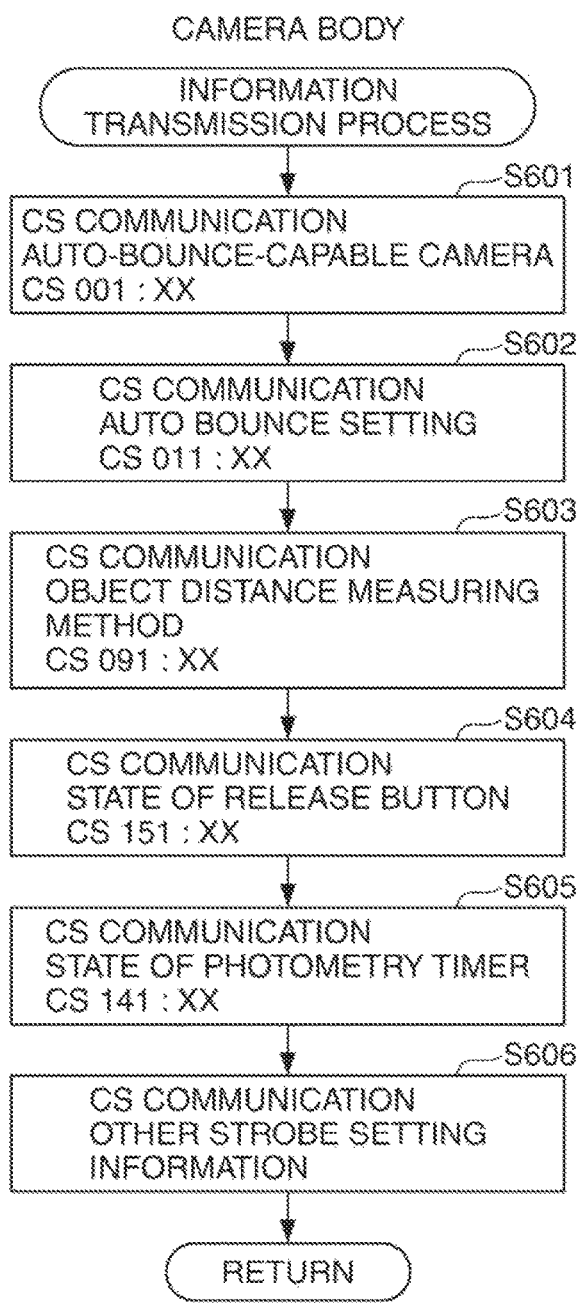
FIG. 8A and FIG. 8B are flowcharts respectively showing processes in the camera body and the strobe in an information transmission process shown in FIG. 4.
Figure 8B:
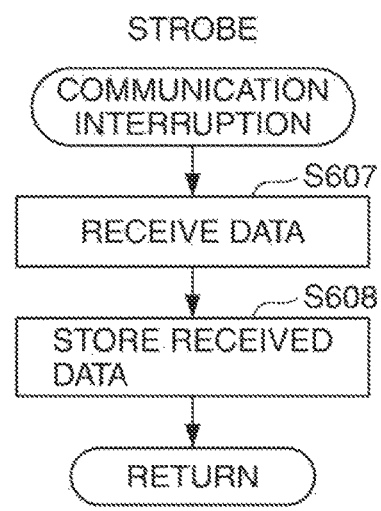

Next, the information transmission process performed in the step S7 in FIG. 4 will be described. FIG. 8A and FIG. 8B are flowcharts respectively showing processes in the camera body 100 and the strobe 300 in an information transmission process.

When the information transmission process is started, the camera microcomputer 101 in the camera body 100 transmits the data set up in the above-mentioned step S502 or S503 to the strobe microcomputer 310 (step S601). Subsequently, the camera microcomputer 101 transmits the data set up in the step S505 or S506 shown in FIG. 6 to the strobe microcomputer 310 (step S602).

Next, the camera microcomputer 101 transmits the data set up in the step S508 shown in FIG. 6 to the strobe microcomputer 310, when the distance measuring method is set up (step S603). Furthermore, the camera microcomputer 101 transmits the data set up in the step S510, S511, or S512 shown in FIG. 6 to the strobe microcomputer 310 (step S604).

Subsequently, the camera microcomputer 101 transmits the data set up in the step S514 or S515 shown in FIG. 6 to the strobe microcomputer 310 (step S605). Then, the camera microcomputer 101 transmits the data stored in the built-in RAM by the process in the step S516 shown in FIG. 6 to the strobe microcomputer 310 (step S606). Then, the camera microcomputer 101 proceeds with the process to the step S11 shown in FIG. 4.

When receiving communication interruption from the camera microcomputer 101, the strobe microcomputer 310 receives the data transmitted from the camera microcomputer 101 (step S607). Then, the strobe microcomputer 310 stores the received data concerned into the built-in RAM (step S608), and finishes the information reception.

Figure 9:
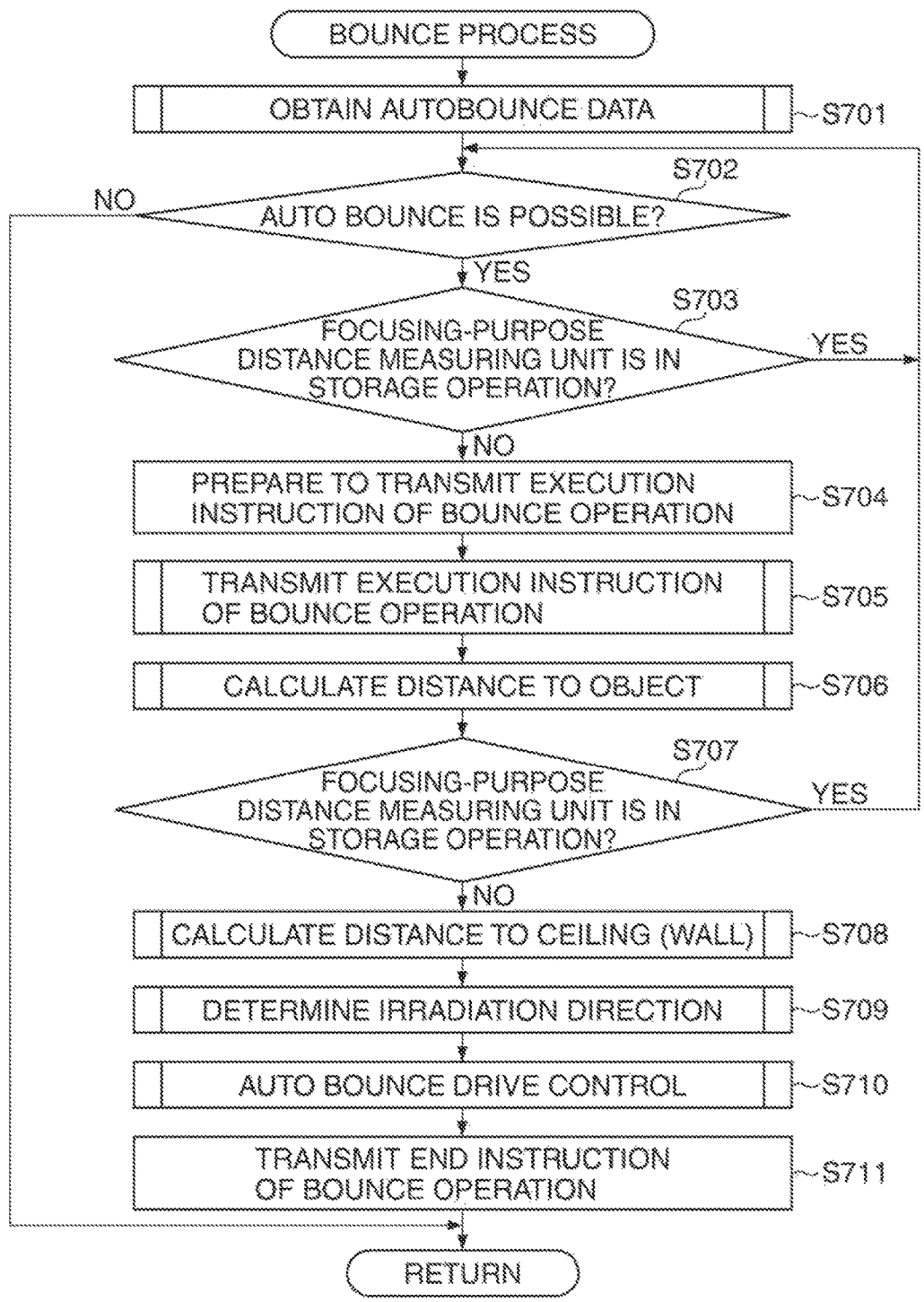
FIG. 9 is a flowchart showing a bounce process shown in FIG. 4.

Next, the bounce process performed in the step S12 in FIG. 4 will be described. FIG. 9 is a flowchart showing an example of the bounce process.

When the bounce process is started, the camera microcomputer 101 obtains auto bounce data from the strobe microcomputer 310 first (step S701) as mentioned later. Then, the camera microcomputer 101 determines whether an auto bounce operation is possible on the basis of the auto bounce data (step S702). In the process in the step S702, the camera microcomputer 101 determines whether the strobe 300 is able to perform an auto bounce operation according to the setting about the auto bounce operation and the auto bounce data received.

When determining that the auto bounce operation is not possible (NO in the step S702), the camera microcomputer 101 proceeds with the process to the step S13 shown in FIG. 4.

On the other hand, when determining that the auto bounce operation is possible (YES in the step S702), the camera microcomputer 101 checks whether the focusing-purpose distance measuring unit 107 is in a charge storage operation (step S703). When the focusing-purpose distance measuring unit 107 is in the charge-storage operation (YES in the step S703), the camera microcomputer 101 returns the process to the step S702. It should be noted that the process in the step S703 is performed so that the AF storage operation does not overlap with the pre-emission operation.

When the focusing-purpose distance measuring unit 107 is not in the charge storage operation (NO in the step S703), the camera microcomputer 101 prepares to transmit an execution instruction of the bounce operation (step S704). Then, the camera microcomputer 101 transmits the execution instruction of the bounce operation to the strobe microcomputer 310 as mentioned later (step S705).

Subsequently, the camera microcomputer 101 computes the distance to the object in order to determine the irradiation direction that is optimal for the bounce emission photographing (step S706) as mentioned later. Then, the camera microcomputer 101 checks whether the focusing-purpose distance measuring unit 107 is in the charge storage operation again (step S707). When the focusing-purpose distance measuring unit 107 is in the charge-storage operation (YES in the step S707), the camera microcomputer 101 returns the process to the step S702.

When the focusing-purpose distance measuring unit 107 is not in the charge storage operation (NO in the step S707), the camera microcomputer 101 computes the distance to the ceiling (wall) in order to determine the irradiation direction that is optimal for the bounce emission photographing (step S708) as mentioned later. Then, the camera microcomputer 101 determines the irradiation direction that is optimal for the bounce emission photographing (step S709) as mentioned later.

Subsequently, the camera microcomputer 101 drivingly controls the auto bounce operation so that the irradiation direction becomes optimal (step S710). Then, the camera microcomputer 101 transmits an end instruction of the bounce operation to the strobe microcomputer 310 (step S711). Then, the camera microcomputer 101 proceeds with the process to the step S13 shown in FIG. 4.

Figure 10B:
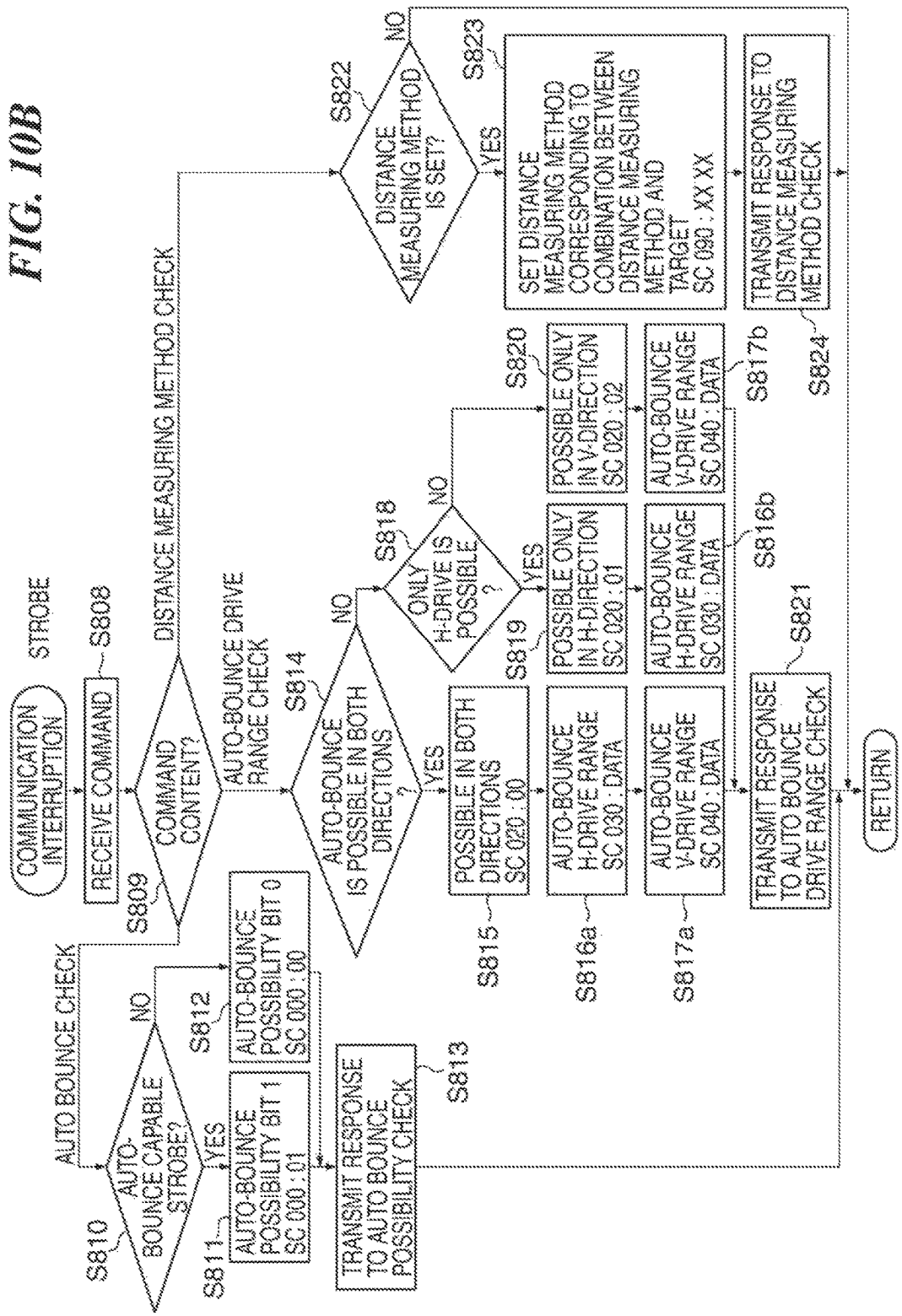

Next, the auto-bounce data obtaining process performed in the step S701 in FIG. 9 will be described. FIG. 10A and FIG. 10B are flowcharts respectively showing processes in the camera body and the strobe in the auto-bounce data obtaining process in FIG. 9.

When the auto-bounce data obtaining process is started, the camera microcomputer 101 transmits the command to the strobe microcomputer 310 for checking whether the strobe 300 is possible to perform auto bounce (step S801), as shown in FIG. 10A. Then, the camera microcomputer 101 receives a response to the command that checks whether the auto bounce is possible from the strobe microcomputer 310 (step S802).

Next, the camera microcomputer 101 transmits the command to the strobe microcomputer 310 for checking the drive range in the auto bounce (step S803). Then, the camera microcomputer 101 receives a response to the command that checks the drive range in the auto bounce from the strobe microcomputer 310 (step S804).

Subsequently, the camera microcomputer 101 transmits the command to the strobe microcomputer 310 for checking a distance measuring method by which a distance to a target is calculated (step S805). Then, the camera microcomputer 101 receives the response to the command that checks the distance measuring method from the strobe microcomputer 310 (step S806).

Furthermore, the camera microcomputer 101 stores the data received in the steps S802, S804, and S806 into the built-in RAM (step S807). Then, the camera microcomputer 101 proceeds with the process to the step S702 shown in FIG. 9.

In the strobe 300, when a communication interrupt is received from the camera microcomputer 101, the strobe microcomputer 310 receives a command transmitted from the camera microcomputer 101 (step S808), as shown in FIG. 10B. Then, the strobe microcomputer 310 determines the contents of the command (step S809).

When the content of the command is "auto bounce possibility check" ("AUTO BOUNCE CHECK" in the step S809), the strobe microcomputer 310 determines whether the strobe 300 is capable of performing the auto bounce (step S810). When the auto bounce is possible (YES in the step S810), the strobe microcomputer 310 stores "SC000 command: 01" into the built-in RAM as preparation of the strobe-camera communication (SC) (step S811). On the other hand, when the auto bounce is impossible (NO in the step S810), the strobe microcomputer 310 stores "SC000 command: 00" into the built-in RAM as preparation of the strobe-camera communication (SC) (step S812).

After the process in the step S811 or S812, the strobe microcomputer 310 transmits the data stored in the built-in RAM as a response to the command for checking the auto-bounce possibility (step S813). After that, the strobe microcomputer 310 finishes the process.

When the content of the command is "auto bounce drive range check" ("AUTO BOUNCE DRIVE RANGE CHECK" in the step S809), the strobe microcomputer 310 determines whether the auto bounce 300 is possible in both of the vertical direction and the horizontal direction as the auto bounce drive range (step S814).

When the auto bounce is possible in both of the vertical direction and the horizontal direction (YES in the step S814), the strobe microcomputer 310 stores "SC020 command: data 00" into the built-in RAM as preparation of the strobe-camera communication (SC) (step S815). Then, the strobe microcomputer 310 stores "SC030 command: data XX (start) XX (end)" as the drive range in the horizontal direction (auto-bounce H-drive range) into the built-in RAM as preparation of the strobe-camera communication (SC) (step S816a).

Subsequently, the strobe microcomputer 310 stores "SC040 command: data XX (start) XX (end)" as the drive range in the vertical direction (auto-bounce V-drive range) into the built-in RAM as preparation of the strobe-camera communication (SC) (step S817a).

When the auto bounce is possible in not both of the vertical direction and the horizontal direction (NO in the step S814), the strobe microcomputer 310 determines whether the auto bounce is possible in the horizontal direction only (step S818). When the auto bounce is possible only in the horizontal direction (YES in the step S818), the strobe microcomputer 310 stores "SC020 command: data 01" into the built-in RAM as preparation of the strobe-camera communication (SC) (step S819). Then, the strobe microcomputer 310 stores "SC030 command: data XX (start) XX (end)" as the drive range in the horizontal direction into the built-in RAM as preparation of the strobe-camera communication (SC) (step S816b).

When the auto bounce is not possible in the horizontal direction (NO in the step S818), i.e., when the auto bounce is possible only in the vertical direction, the strobe microcomputer 310 stores "SC020 command: data 02" in the built-in RAM as preparation of the strobe-camera communication (SC) (step S820). Then, the strobe microcomputer 310 stores "SC030 command: data XX (start) XX (end)" as the drive range in the vertical direction into the built-in RAM as preparation of the strobe-camera communication (SC) (step S817b).

After the process in the step S817a, S816b or S817b, the strobe microcomputer 310 transmits the data stored in the built-in RAM as a response to the command for checking the auto-bounce drive range (step S821). After that, the strobe microcomputer 310 finishes the process.

When the content of the command is "distance measuring method check" ("DISTANCE MEASURING METHOD CHECK" in the step S809), the strobe microcomputer 310 determines whether a distance measuring method for calculating a distance to a target of the auto bounce is set up (step S822). When the distance measuring method is set up (YES in the step S822), the strobe microcomputer 310 stores "SC090 command: XX XX" corresponding to a combination between the setting of the distance measuring method and the target into the built-in RAM (step S823). Then, the strobe microcomputer 310 transmits the data stored in the built-in RAM as a response to the command for checking the distance measuring method to the camera microcomputer 101 (step S824). After that, the strobe microcomputer 310 finishes the process.

When the distance measuring method is not set up (NO in the step S822), the strobe microcomputer 310 transmits that effect to the camera microcomputer 101, and finishes the process.

Figure 11A:
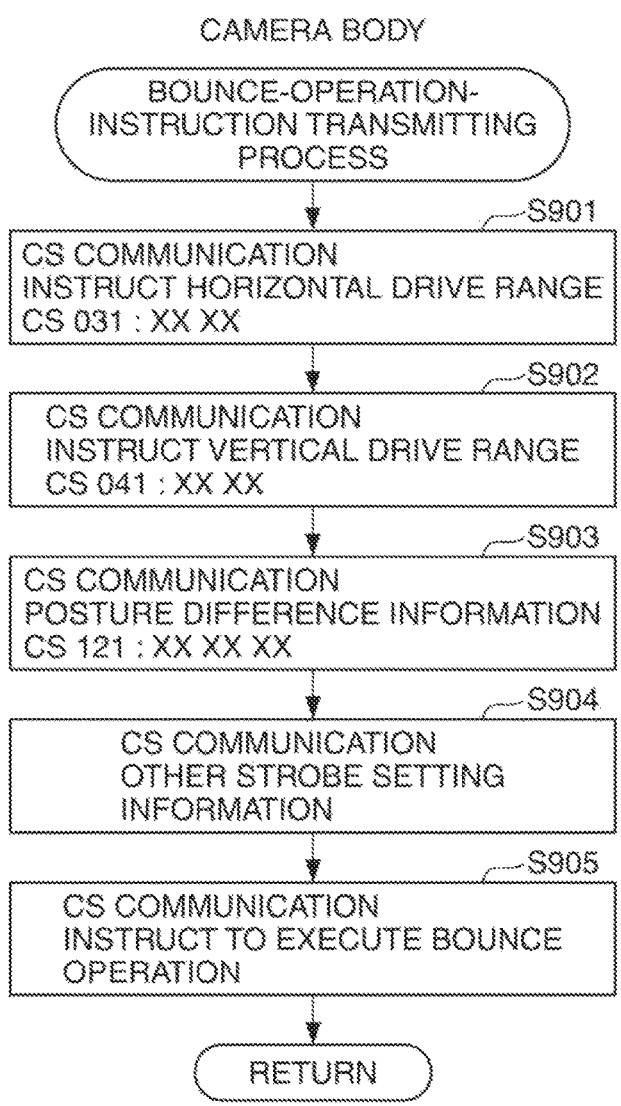
FIG. 11A and FIG. 11B are flowcharts respectively showing processes in the camera body and the strobe in a bounce-operation-instruction transmitting process shown in FIG. 9.
Figure 11B:
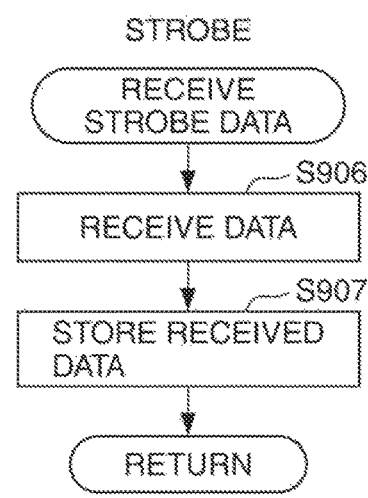

Next, the bounce-operation-instruction transmitting process performed in the step S705 in FIG. 9. FIG. 11A and FIG. 11B are flowcharts respectively showing processes in the camera body and the strobe in the bounce-operation-instruction transmitting process.

When the bounce-operation-instruction transmitting process is started, the camera microcomputer 101 transmits "CS031 command: data XX XX" to the strobe microcomputer 310 in order to set up the horizontal drive range of the bounce operation (step S901). When the horizontal drive range is not set up, the camera microcomputer 101 omits the process in the step S901.

Subsequently, the camera microcomputer 101 transmits "CS041 command: data XX XX" to the strobe microcomputer 310 in order to set up the vertical drive range of the bounce operation (step S902). When the vertical drive range is not set up, the camera microcomputer 101 omits the process in the step S902.

Next, the camera microcomputer 101 transmits "CS121 command: data XX XX XX" as the posture difference information that includes detection results of the posture V detection circuit 140a, posture H detection circuit 140b, and posture Z detection circuit 140c to the strobe microcomputer 310 (step S903). Then, the camera microcomputer 101 transmits the other strobe setting information to the strobe microcomputer 310 (step S904).

Subsequently, the camera microcomputer 101 transmits an execution instruction of the bounce operation to the strobe microcomputer 310 (step S905). Then, the camera microcomputer 101 shifts the process to the step S706 in FIG. 9.

In the strobe 300, when a communication interrupt is received from the camera microcomputer 101, the strobe microcomputer 310 receives the data transmitted from the camera microcomputer 101 (step S906). Then, the strobe microcomputer 310 stores the received data concerned into the built-in RAM (step S907). After that, the strobe microcomputer 310 starts the bounce operation.

Figure 12A:
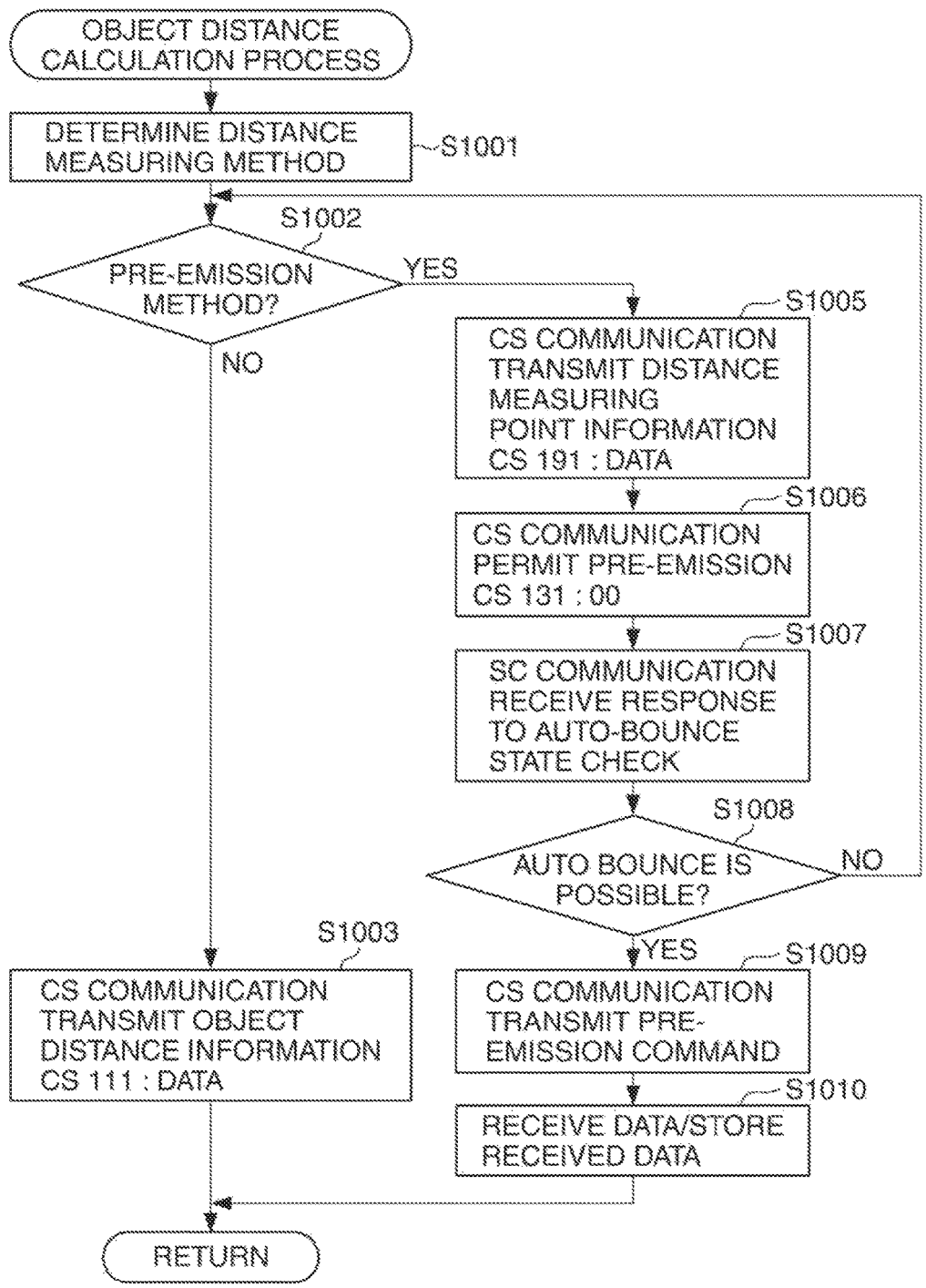
FIG. 12A and FIG. 12B are flowcharts respectively showing processes in the camera body and the strobe in an object distance calculation process shown in FIG. 9.
Figure 12B:
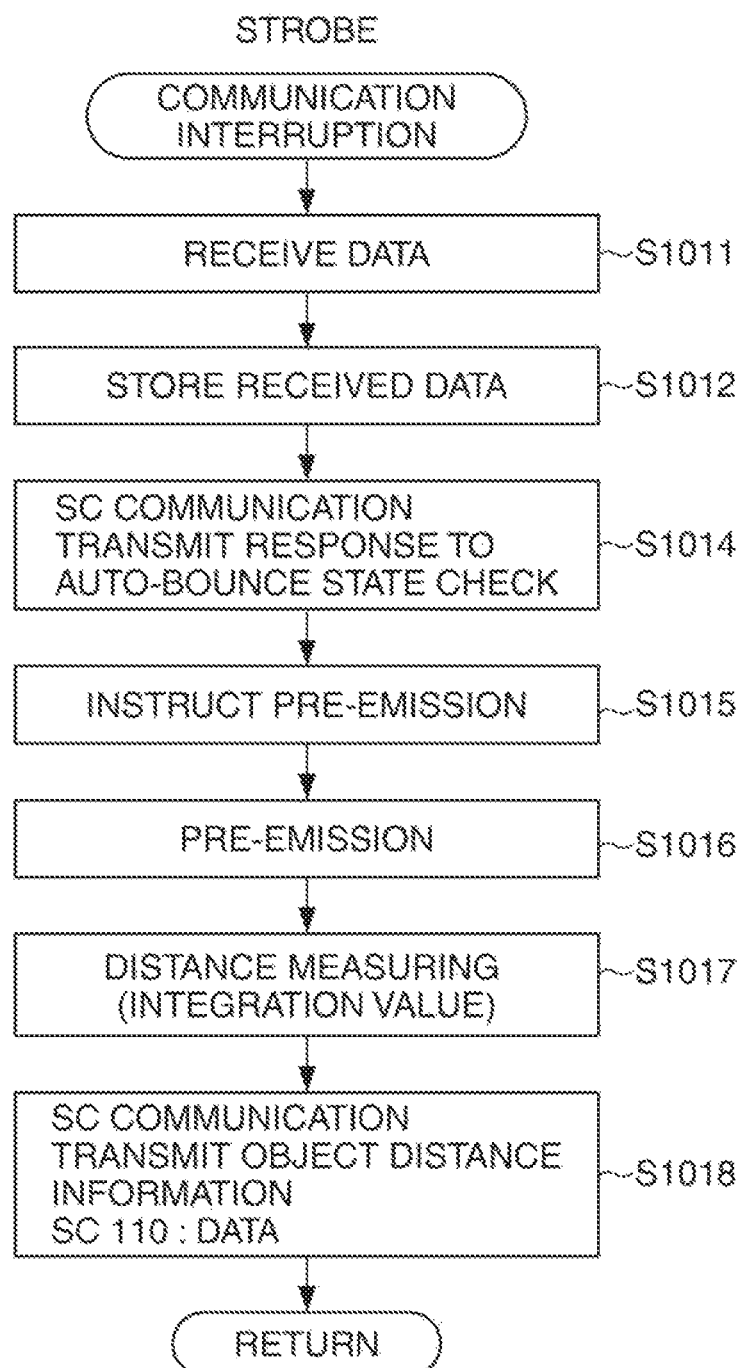

Next, the object distance calculation process performed in the step S706 in FIG. 9 will be described. FIG. 12A and FIG. 12B are flowcharts respectively showing processes in the camera body and the strobe in the object distance calculation process.

When the object distance calculation process is started, the camera microcomputer 101 determines the distance measuring method for calculating the object distance (step S1001). Then, the camera microcomputer 101 determines whether the distance measuring method is the pre-emission method (step S1002).

When the distance measuring method is not the pre-emission method (NO in the step S1002), the camera microcomputer 101 transmits "CS111 command: data XX" as the object distance information to the strobe microcomputer 310 (step S1003). Then, the camera microcomputer 101 shifts the process to the step S707 shown in FIG. 9.

When the camera microcomputer 101 has been notified of the strobe distance measuring method as the distance measuring method on the basis of the auto bounce data, the camera microcomputer 101 omits the process in the step S1002.

When the distance measuring method is the pre-emission method (YES in the step S1002), the camera microcomputer 101 transmits "CS191 command: data xx xx" to the strobe microcomputer 310 as distance measuring point information (step S1005). Then, the camera microcomputer 101 transmits "CS131 command: data 00" to the strobe microcomputer 310 as a pre-emission permission (step S1006).

Subsequently, the camera microcomputer 101 receives a response to the auto-bounce state check from the strobe microcomputer 310 (step S1007). Then, the camera microcomputer 101 determines whether the auto bounce is possible (step S1008). When the auto bounce is possible (YES in the step S1008), the camera microcomputer 101 transmits a pre-emission command to the strobe microcomputer 310 (step S1009). The camera microcomputer 101 receives the object distance information from the strobe microcomputer 310, and stores the received object distance information concerned into the built-in RAM (step S1010). Then, the camera microcomputer 101 shifts the process to the step S707 shown in FIG. 9.

In the strobe 300, when a communication interrupt is received from the camera microcomputer 101, the strobe microcomputer 310 receives the data transmitted from the camera microcomputer 101 (step S1011). Then, the strobe microcomputer 310 stores the received data concerned into the built-in RAM (step S1012).

Subsequently, when receiving interruption by the process in the step S1007, the strobe microcomputer 310 transmit a response to the auto-bounce state check to the camera microcomputer 101 (step S1014). In this case, the strobe microcomputer 310 transmits information about whether the strobe 300 is able to perform the auto bounce to the camera microcomputer 101.

Next, the strobe microcomputer 310 instructs the pre-emission to the emission control circuit 304 according to the pre-emission command, after rotating the moving part (step S1015). As a result of this, the emission control circuit 304 pre-emits the discharge tube 305 (step S1016). After that, the bounce-purpose distance measuring unit 308 receives the reflected light of the pre-emission reflected by the target with the photosensor. The strobe microcomputer 310 calculates the object distance on the basis of an integration value of the reflected light amount received (step S1017).

Subsequently, the strobe microcomputer 310 transmits "SC110 command: data XX" that shows the object distance to the camera microcomputer 101 (step S1018). After that, the strobe microcomputer 310 finishes the process.

Figure 13A:
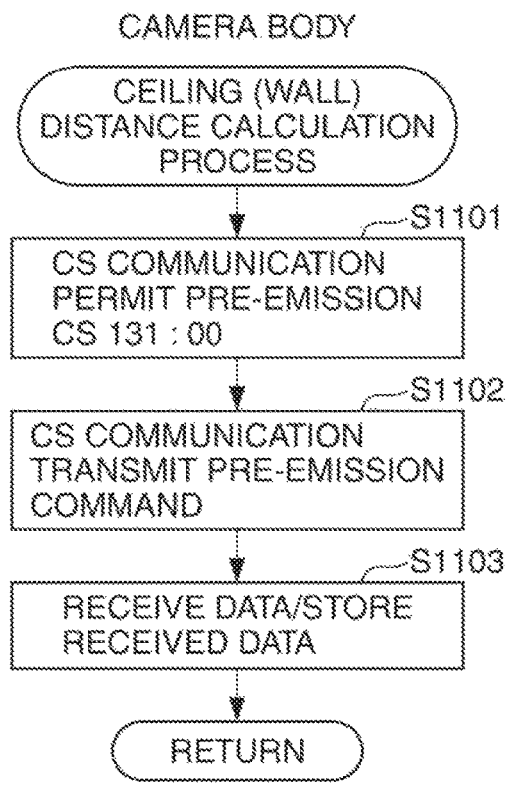
FIG. 13A and FIG. 13B are flowcharts respectively showing processes in the camera body and the strobe in a ceiling (wall) distance calculation process shown in FIG. 9.
Figure 13B:
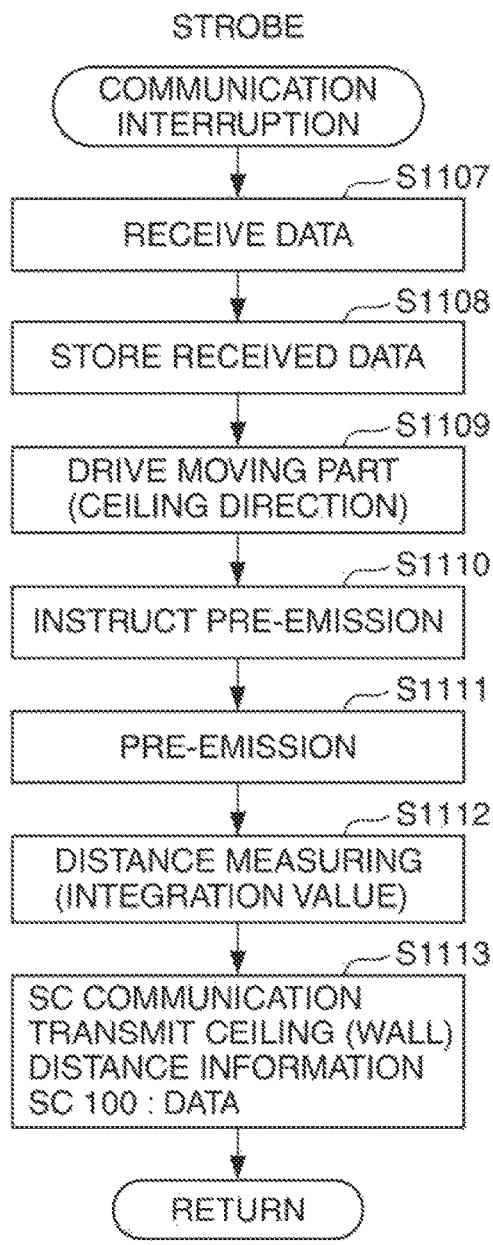

Next, the ceiling (wall) distance calculation process performed in the step S708 in FIG. 9 will be described. It should be noted that a distance to a ceiling or wall is referred to as a ceiling (wall) distance. FIG. 13A and FIG. 13B are flowcharts respectively showing processes in the camera body and the strobe in the ceiling (wall) distance calculation process.

When the ceiling (wall) distance calculation process is started, the camera microcomputer 101 stores "CS131 command: data 00" into the built-in RAM as a pre-emission permission (step S1101). Then, the camera microcomputer 101 transmits the pre-emission command stored in the built-in RAM to the strobe microcomputer 310 (step S1102). The camera microcomputer 101 receives the ceiling (wall) distance information from the strobe microcomputer 310, and stores the received ceiling (wall) distance information concerned into the built-in RAM (step S1103). Then, the camera microcomputer 101 shifts the process to the step S709 shown in FIG. 9.

In the strobe 300, when a communication interrupt is received from the camera microcomputer 101, the strobe microcomputer 310 receives the data transmitted from the camera microcomputer 101 (step S1107). Then, the strobe microcomputer 310 stores the received data concerned into the built-in RAM (step S1108).

Subsequently, when receiving the pre-emission permission, the strobe microcomputer 310 controls the bounce circuit 340 to drive the moving part 300b so that the irradiation direction becomes the ceiling direction (step S1109). After driving the moving part 300b, the strobe microcomputer 310 instructs the pre-emission to the emission control circuit 304 according to the pre-emission command (step S1110). As a result of this, the emission control circuit 304 pre-emits the discharge tube 305 (step S1111).

Subsequently, the bounce-purpose distance measuring unit 308 receives the reflected light of the pre-emission reflected by the target with the photosensor. The strobe microcomputer 310 calculates the ceiling (wall) distance on the basis of an integration value of the reflected light amount received (step S1112). Then, the strobe microcomputer 310 transmits "SC100 command: data XX" as ceiling distance information that shows the calculated ceiling (wall) distance to the camera microcomputer 101 (step S1113). After that, the strobe microcomputer 310 finishes the process.

Figure 14A:
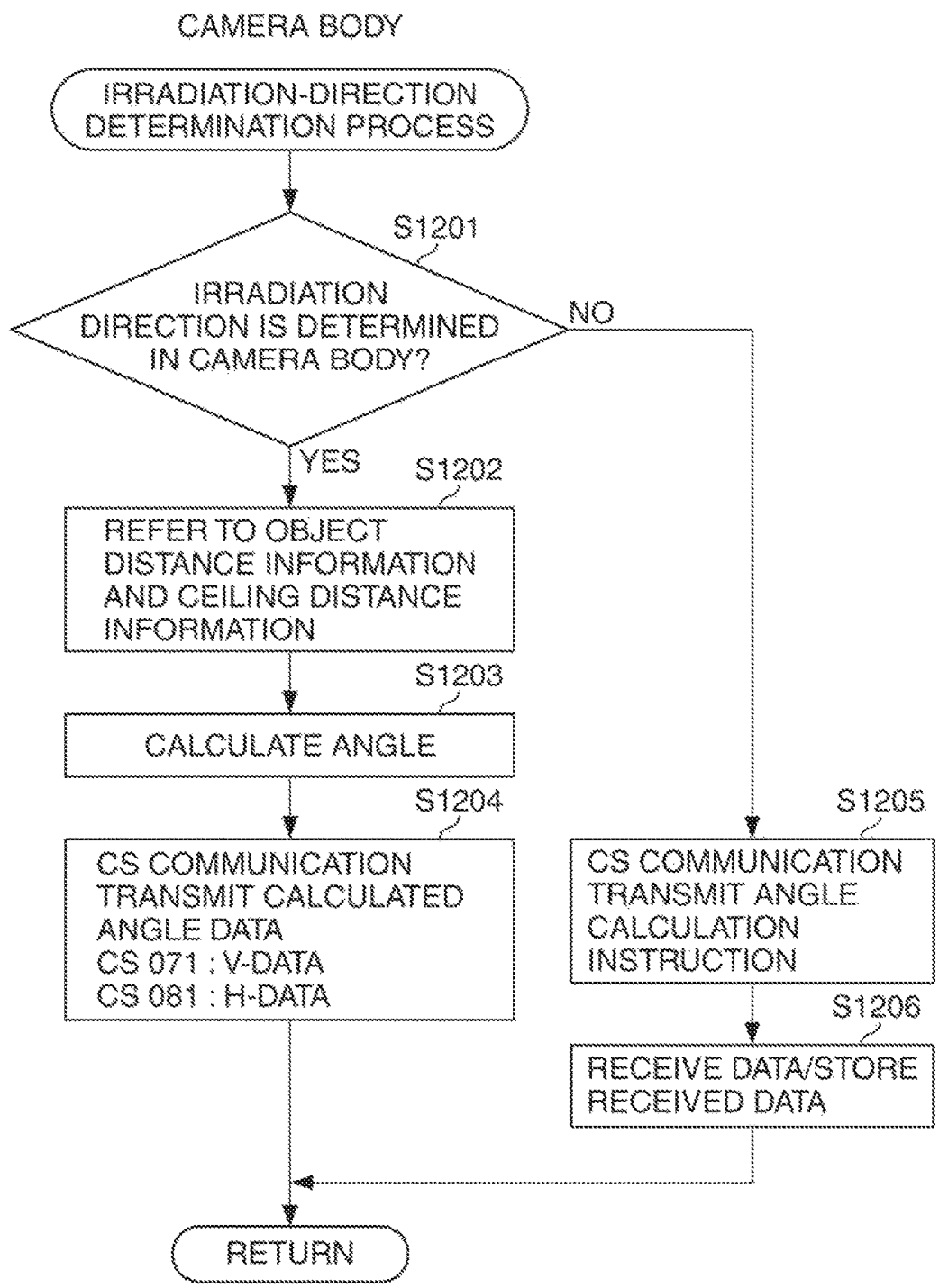
FIG. 14A and FIG. 14B are flowcharts respectively showing processes in the camera body and the strobe in an irradiation-direction determination process shown in FIG. 9.
Figure 14B:
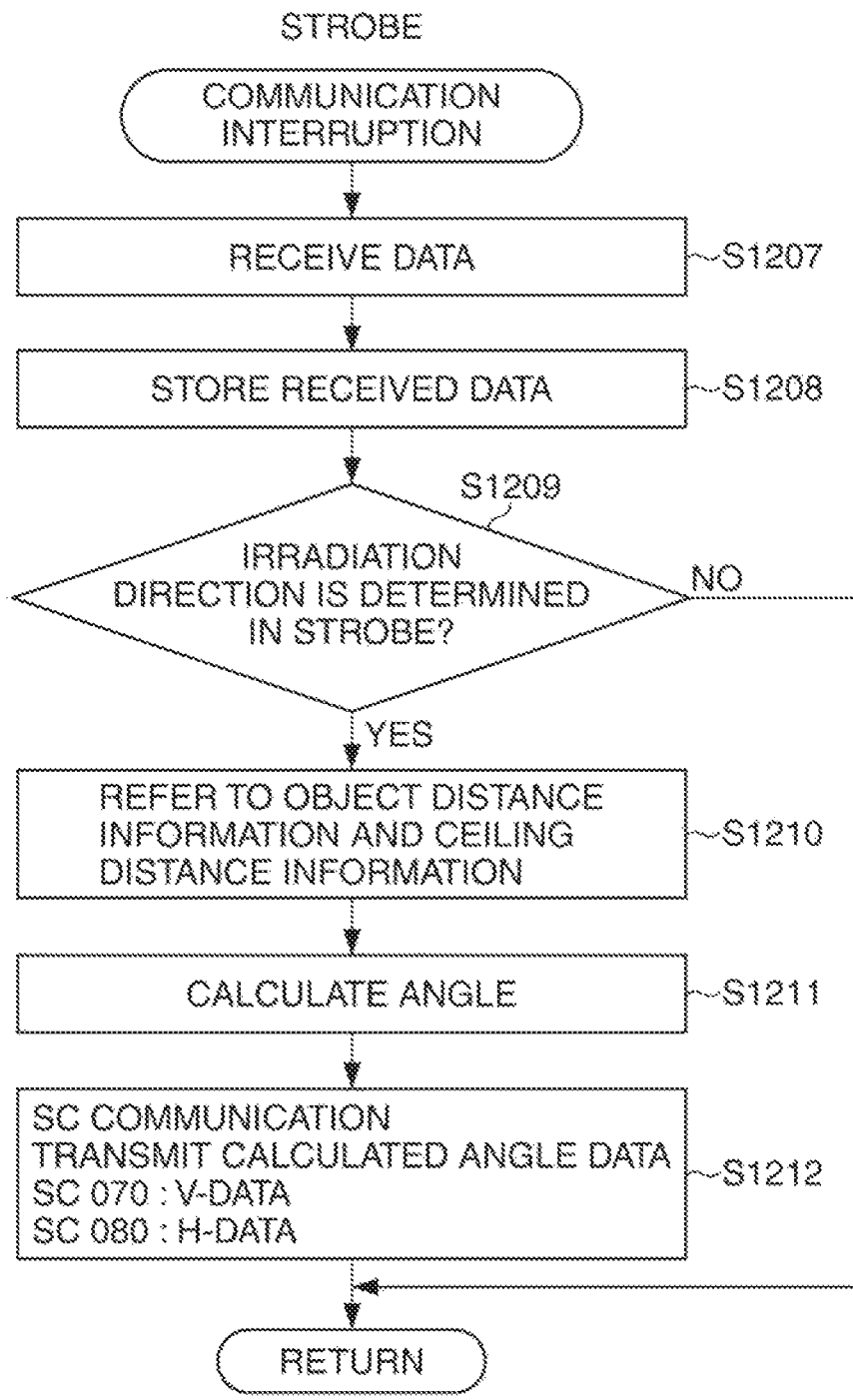

Next, the irradiation-direction determination process performed in the step S709 in FIG. 9 will be described. FIG. 14A and FIG. 14B are flowcharts respectively showing processes in the camera body and the strobe in the irradiation-direction determination process.

When the irradiation-direction determination process is started, the camera microcomputer 101 determines whether the irradiation direction is determined in the camera body 100 (step S1201). When the irradiation direction is able to be determined in both of the camera body 100 and the strobe 300, it may be determined in any side. Moreover, the camera body 100 or the strobe 300 that determines the irradiation direction may be selected by an operation through the input unit 112. Furthermore, when only one of the camera body 100 and the strobe 300 is able to determine the irradiation direction, the microcomputer which determines the irradiation direction is automatically set up.

When the irradiation direction is determined in the camera body 100 (YES in the step S1201), the camera microcomputer 101 refers to the object distance information computed by the process in the step S706 shown in FIG. 9 and the ceiling (wall) distance information computed by the process in the step S708 in order to determine the irradiation direction (step S1202). Then, the camera microcomputer 101 determines the irradiation direction that is optimal for the bounce emission photographing on the basis of the object distance information and the ceiling (wall) distance information (step S1203). In this case, the camera microcomputer 101 finds the rotational angle of the moving part 300b so that the optimal irradiation direction is obtained.

It should be noted that the rotational angle of the moving part 300b may be calculated in any method as long as the rotational angle is calculated on the basis of the object distance and the ceiling distance.

FIG. 15 is a view showing an example of a scene of the bounce emission photographing performed with the camera shown in FIG. 1 and FIG. 2.

A distance between an object and a projection surface of strobe light of the strobe 300 shall be "d1". The reflected light optimal to the object shall be obtained by reflecting the strobe light at a point of distance "d1/2" on a ceiling.

When a distance between the strobe 300 and the ceiling shall be "h1", the optimal irradiation angle "θ1" with respect to the horizontal direction is calculated according to the following formula (4).

$$\theta 1 = \tan^{-1}(2h1/d1) \quad (4)$$

Accordingly, it is enough to calculate the rotational angle of the moving part 300b with respect to the main part 300a so that the irradiation direction matches the optimal irradiation angle "θ1".

The moving part 300b may be rotated to be a preset designated angle that is selected according to the calculated rotational angle in order to cope with a case where the moving part 300b cannot be rotated to the calculated rotational angle. In this case, the designated angle larger than the calculated rotation angle is selected. That is, the moving part 300b will be rotated to a position that is distant from a home position rather than the position of the calculated rotational angle.

As a result of this, a front side of an object is irradiated with more reflected light from a ceiling as compared with a case where a designated angle smaller than the calculated rotational angle is selected. Furthermore, the object is not irradiated with the strobe light directly.

With reference to FIG. 14A again, the camera microcomputer 101 transmits "CS071: V-data (vertical data) XX" and the "CS081: H-data (horizontal data) XX" to the strobe microcomputer 310 as the angular information that shows the above-mentioned rotational angle (step S1204). Then, the camera microcomputer 101 shifts the process to the step S710 shown in FIG. 9.

When the irradiation direction is not determined in the camera body 100 (NO in the step S1201), the camera microcomputer 101 transmits "CS171: 00" to the strobe microcomputer 310 as an angle calculation instruction (step S1205). After that, the camera microcomputer 101 receives the angular information from the strobe microcomputer 310, and stores the angular information concerned into the built-in RAM. Then, the camera microcomputer 101 shifts the process to the step S710 shown in FIG. 9.

In the strobe 300, when a communication interrupt is received from the camera microcomputer 101, the strobe microcomputer 310 receives the data transmitted from the camera microcomputer 101 (step S1207). Then, the strobe microcomputer 310 stores the received data concerned into the built-in RAM (step S1208).

Subsequently, the strobe microcomputer 310 determines whether an irradiation direction is determined in the strobe 300 (step S1209). When the irradiation direction is determined in the strobe 300 (YES in the step S1209), the strobe microcomputer 310 refers to the object distance information calculated by the process in the step S706 shown in FIG. 9 and the ceiling (wall) distance information calculated by the process in the step S708 in order to determine the irradiation direction (step S1210). Then, the strobe microcomputer 310 determines the irradiation direction that is optimal for the bounce emission photographing on the basis of the object distance information and the ceiling (wall) distance information (step S1211). Since the method for determining the irradiation direction is the same as that in the case where the irradiation direction is determined in the camera body 100, the description is omitted here.

Subsequently, the strobe microcomputer 310 transmits "SC070: V-data XX" and "SC080: H-data XX" to the camera microcomputer 101 as the angular information that shows the calculated rotational angle (step S1212). After that, the strobe microcomputer 310 finishes the process.

When the irradiation direction is not determined in the strobe 300 (NO in the step S1209), the strobe microcomputer 310 finishes the process.

Figure 16A:
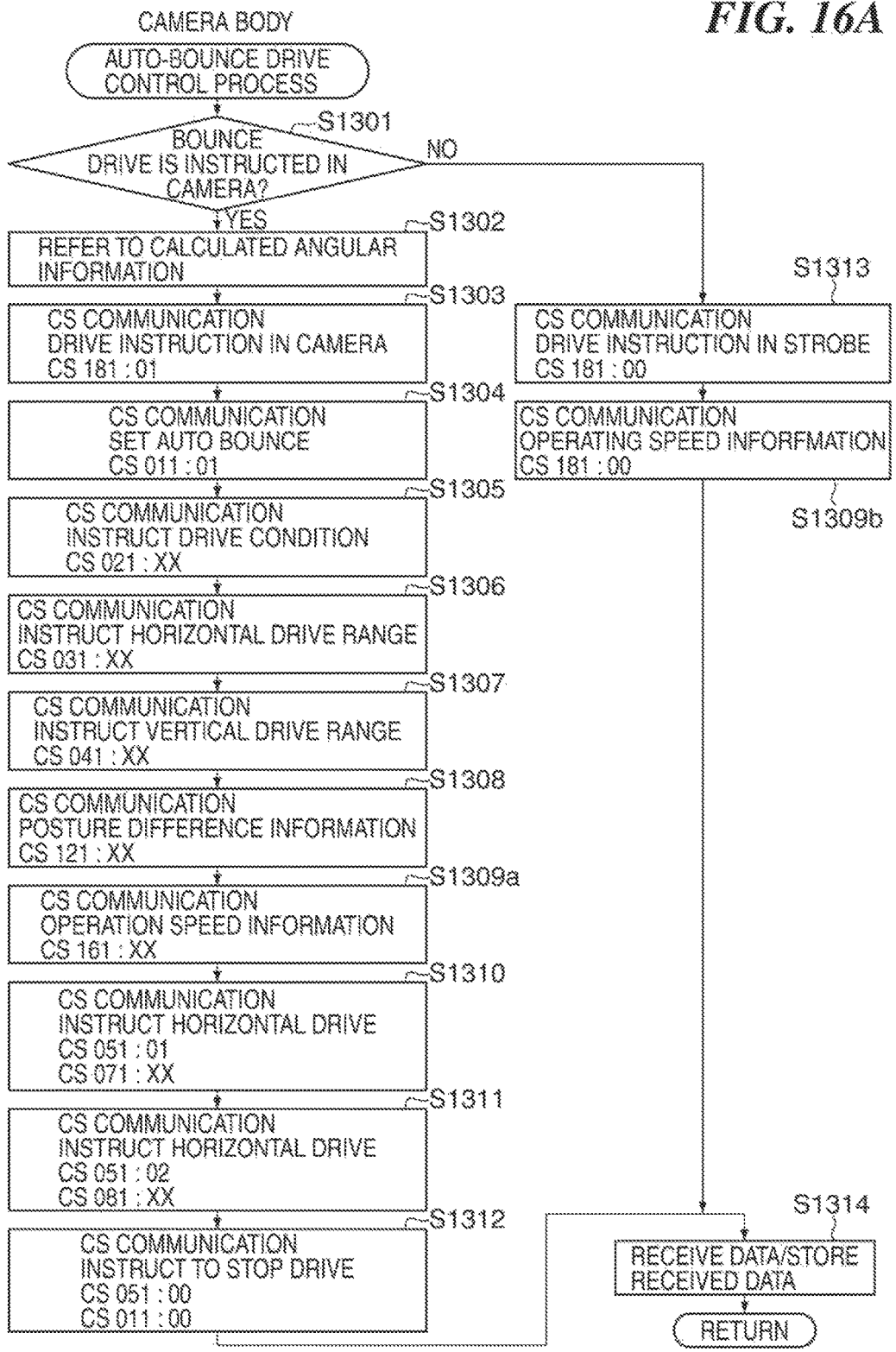
FIG. 16A is a flowchart showing a process performed with the camera body in a bounce drive control process shown in FIG. 9.

Next, the auto-bounce drive control process performed in the step S710 in FIG. 9 will be described. FIG. 16A is a flowchart showing a process performed with the camera body in the auto-bounce drive control process.

FIG. 16B is a flowchart showing a process performed with the strobe in the auto-bounce drive control process.

When the auto-bounce drive control process is started, the camera microcomputer 101 determines whether the bounce drive is instructed in the camera body 100 as shown in FIG. 16A (step S1301). When the bounce drive is instructed in the camera body 100 (YES in the step S1301), the camera microcomputer 101 refers to the angular information calculated by the process in the step S709 shown in FIG. 9 (step S1302). Then, the camera microcomputer 101 transmits "CS181 command: data 01" to the strobe microcomputer 310 in order to notify that the bounce drive is instructed in the camera body 100 (step S1303).

Next, the camera microcomputer 101 transmits "CS011 command: data 01" to the strobe microcomputer 310 as the auto bounce setting (step S1304). Then, the camera microcomputer 101 transmits "CS021 command: data XX" to the strobe microcomputer 310 as the drive condition of the auto bounce (step S1305). The data XX is "00" for both horizontal and vertical, is "01" for horizontal only, and is "02" for vertical only.

Subsequently, the camera microcomputer 101 transmits "CS031 command: data XX XX" to the strobe microcomputer 310 as the horizontal drive range (step S1306). Then, the camera microcomputer 101 transmits "CS041 command: data XX XX" to the strobe microcomputer 310 as the vertical drive range (step S1307).

Next, the camera microcomputer 101 transmits "CS1231 command: data XX XX XX" to the strobe microcomputer 310 as the posture difference information (step S1308). Then, the camera microcomputer 101 transmits "CS161 command:" to the strobe microcomputer 310 as operation speed information that shows speed at which the moving part 300b is rotated (driving speed of the motor of the bounce drive circuit 340) (step S1309a). The data XX is "00" for normal speed (standard speed), is "01" for low speed (50% of the standard speed), and is "02" for high speed (150% of the standard speed). The steps of the speed may be defined more finely.

Since the speed for rotating the moving part 300b is variable, operating sound of the motor for rotating the moving part 300b is able to be set up fitted to a scene. The speed at which the moving part 300b is rotated is changed by a user's operation through the input unit 112.

Subsequently, the camera microcomputer 101 transmits "CS051 command: data 01" and "CS071 command: data XX" to the strobe microcomputer 310 as the vertical drive instruction (step S1310). Then, the camera microcomputer 101 transmits "CS051 command: data 02" and "CS081 command: data XX" to the strobe microcomputer 310 as the horizontal drive instruction (step S1311).

After the completion of the bounce drive, the camera microcomputer 101 transmits "CS051 command: data 00" and "CS011 command: data 00" to the strobe microcomputer 310 as a stop instruction of the bounce drive (step S1312).

When the bounce drive is instructed in the strobe 300 (NO in the step S1301), the camera microcomputer 101 transmits "CS181 command: data 00" to the strobe microcomputer 310 in order to notify that the bounce drive is instructed in the strobe 300 (step S1313). Then, the camera microcomputer 101 transmits "CS161 command: data XX" to the strobe microcomputer 310 as the operation speed information in the same manner as the process in the step S1309a (step S1309b).

After the process in the step S1312 or S1309b, the camera microcomputer 101 receives current position information that shows the current position of the moving part 300b from the strobe microcomputer 310, and stores the current position information concerned into the built-in RAM. Then, the camera microcomputer 101 shifts the process to the step S711 shown in FIG. 9.

In the strobe 300, when a communication interrupt is received from the camera microcomputer 101, the strobe microcomputer 310 receives the data transmitted from the camera microcomputer 101 (step S1315), as shown in FIG. 16B. Then, the strobe microcomputer 310 stores the received data into the built-in RAM (step S1316).

Subsequently, the strobe microcomputer 310 determines whether a drive error has occurred during the bounce drive (step S1317a). The drive error occurs when the moving part 300b runs into the end or when the moving part 300b is held down by a hand compulsorily, for example, When the drive error has not occurred (NO in the step S1317a), the strobe microcomputer 310 transmits "SC060 command: data 00" to the camera microcomputer 101 in order to notify that there is no drive error (step S1318).

Next, the strobe microcomputer 310 determines whether the bounce drive is instructed in the camera body 100 (step S1319). When the bounce drive is instructed in the strobe 300 (NO in the step S1319), the strobe microcomputer 310 prepares to instruct the bounce drive in the strobe 300 (step S1320).

Subsequently, the strobe microcomputer 310 refers to the vertical angular information found by the process in the step S709 shown in FIG. 9 (step S1321a). Then, the strobe microcomputer 310 makes the moving part 300b rotate in the vertical rotational angle by driving the motor of the bounce drive circuit 340d according to the vertical angular information (step S1322a).

Next, the strobe microcomputer 310 transmits "SC050 command: data 01" to the camera microcomputer 101 in order to notify that the moving part 300b is in operation vertically (step S1323a). Then, the strobe microcomputer 310 determines whether the drive error has occurred as with the process in the step S1317a (step S1317b).

When the drive error has occurred (YES in the step S1317b), the strobe microcomputer 310 proceeds with the process to the below-mentioned step S1330. On the other hand, when the drive error has not occurred (NO in the step S1317b), the strobe microcomputer 310 refers to the horizontal angular information found by the process in the step S709 shown in FIG. 9 for (step S1324a). Then, the strobe microcomputer 310 makes the moving part 300b rotate in the horizontal rotational angle by driving the motor of the bounce drive circuit 340b according to the horizontal angular information (step S1325a).

After that, the strobe microcomputer 310 transmits "SC050 command: data 02" to the camera microcomputer 101 in order to notify that the moving part 300b is in operation horizontally (step S1326a). Then, the strobe microcomputer 310 determines whether the drive error has occurred as with the process in the step S1317a (step S1317c).

When the drive error has occurred (YES in the step S1317c), the strobe microcomputer 310 proceeds with the process to the below-mentioned step S1330. On the other hand, when the drive error has not occurred (NO in the step S1317c), the strobe microcomputer 310 transmits "SC050 command: data 00" and "SC010 command: data 00" to the camera microcomputer 101 as drive stop information (step S1328) after completing to drive the moving part 300b in the vertical and horizontal directions.

Next, the strobe microcomputer 310 transmits the vertical current bounce angle information "SC070 command: data XX" and the horizontal current bounce angle information "SC080 command: data XX" of the moving part 300b after the bounce drive to the camera microcomputer 101 (step S1329). After that, the strobe microcomputer 310 finishes the process.

When the bounce drive is instructed in the camera body 100 (NO in the step S1319), the strobe microcomputer 310 prepares to instruct the bounce drive in the camera microcomputer 101 (step S1320). Then, the strobe microcomputer 310 performs processes in steps S1321b, S1322b, S1323b, S1317d, S1324b (obtain the horizontal bounce angle data), S1325b, S1326b, and S1317e that are respectively similar to the processes in the steps S1321a, S1322a, S1323a, S1317b, S1324a, S1325a, S1326a, and S1317c.

When the bounce drive error has occurred in the step S1317d or S1317e, the strobe microcomputer 310 proceeds with the process to the step S1330. Moreover, when the bounce drive error has not occurred in the process in the step S1317e, the strobe microcomputer 310 proceeds with the process to the step S1328.

In the step S1317a, when the bounce drive error has occurred (YES in the step S1317a), the strobe microcomputer 310 transmits that effect to the camera microcomputer 101 by the strobe-camera communication (step S1330). Then, the strobe microcomputer 310 proceeds with the process to the step S1329.

Figure 17:
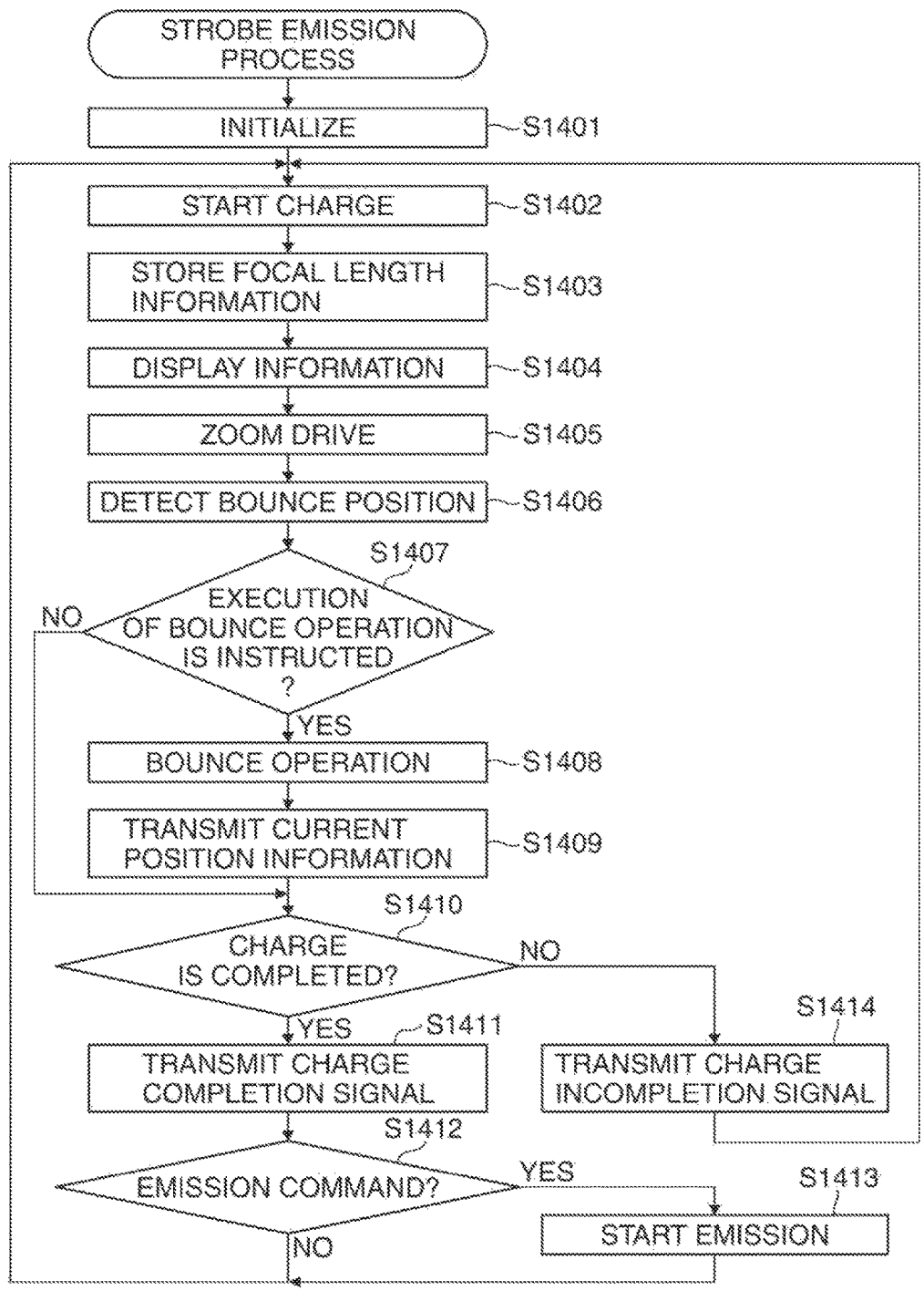
FIG. 17 is a flowchart showing a strobe emission process performed with the strobe shown in FIG. 1 and FIG. 2.

FIG. 17 is a flowchart showing a strobe emission process performed with the strobe 300 shown in FIG. 1 and FIG. 2.

When the power switch of the input unit 312 is turned ON, the strobe microcomputer 310 starts the strobe emission process. Then, the strobe microcomputer 310 initializes an internal memory and a port (step S1401). Furthermore, in the process in the step S1401, the strobe microcomputer 310 reads the states of the switches of the input unit 312 and the preset input information, and sets up emission modes, such as a method for determining an emission amount, and light-emitting timing.

Subsequently, the strobe microcomputer 310 makes the booster circuit block 302 start to charge the main capacitor 302d (step S1402). Then, the strobe microcomputer 310 stores the focal length information obtained from the camera microcomputer 101 through the communication line CL into the built-in RAM (step S1403). When focal distance information has been already stored in the built-in RAM, the strobe microcomputer 310 overwrites the former focal distance information with new focal distance information.

Next, the strobe microcomputer 310 displays the information about the emission mode set up through the input unit 312, the obtained focal length information, etc. on the display unit 313 (step S1404). Then, the strobe microcomputer 310 moves the zoom optical system 307 with the zoom drive circuit 330 so that the irradiation range is fitted to the range corresponding to the focal length information (step S1405).

Subsequently, the strobe microcomputer 310 detects the rotational angles of the moving part 300b with respect to the main part 300a with the bounce H detection circuit 340a and the bounce V detection circuit 340c (step S1406). Then, the strobe microcomputer 310 determines whether an execution of the bounce operation is instructed (step S1407).

When the execution of the bounce operation is instructed (YES in the step S1407), the strobe microcomputer 310 executes the bounce operation (step S1408) as with the above-mentioned steps S1321a through S1382 in FIG. 16B. Then, the strobe microcomputer 310 transmits the current position information that shows the rotational angle of the moving part 300b after the bounce operation with respect to the main part 300a to the camera microcomputer 101 as with the above-mentioned step S1329 in FIG. 16B (step S1409).

Next, the strobe microcomputer 310 determines whether the charging voltage of the main capacitor 302d is equal to or more than a predetermined threshold voltage (charge is completed) (step S1410). When the execution of the bounce operation is not instructed (NO in the step S1407), the strobe microcomputer 310 proceeds with the process to the step S1410.

When the charging voltage is equal to or more than the threshold voltage (YES in the step S1410), the strobe microcomputer 310 transmits a charging completion signal to the camera microcomputer 101 (step S1411). Then, the strobe microcomputer 310 determines whether an emission start signal that is an emission command is received from the camera microcomputer 101 (step S1412).

When the emission start signal is received (YES in the step S1412), the strobe microcomputer 310 controls the emission control circuit 304 in response to the emission start signal to emit the discharge tube 305 (step S1413: light emission start). After that, the strobe microcomputer 310 returns the process to the step S1402. On the other hand, when the emission start signal is not received (NO in the step S1412), the strobe microcomputer 310 returns the process to the step S1402 without executing the step S1413.

When a series of emissions like a pre-emission for distance measuring and a main emission are performed in the process in the step S1413, the strobe microcomputer 310 does not return the process to the step S1402 during the series of emissions, and returns the process to the step S1402 after the series of emissions are completed.

When the charging voltage is less than the threshold voltage (NO in the step S1410), the strobe microcomputer 310 transmits a charge incompletion e signal to the camera microcomputer 101 as (step S1414). Then, the strobe microcomputer 310 returns the process to the step S1402.

Thus, in the first embodiment of the present invention, since the pre-emission operation is prohibited during the focusing-purpose distance measuring operation when the pre-emission control process is performed in the camera body, the focusing in the auto focus is performed correctly and the bounce angle (i.e., the irradiation angle) is set correctly.

It should be noted that each of the flowcharts described in the first embodiment is an example. The processes of each of the flowcharts may be performed in an order different from the above-mentioned description if needed. Furthermore, the above-mentioned command, command number, and data are examples, and any settings are allowed as long as they play the same roles. Moreover, although the first embodiment describes the case where the strobe 300 is equipped with the AF auxiliary light unit 316, the camera body 100 may be equipped with the AF auxiliary light unit 316.

Subsequently, a camera according to a second embodiment of the present invention will be described. It should be noted that the configuration of the camera of the second embodiment is the same as the camera shown in FIG. 1 and FIG. 2.

In the second embodiment, emission of the AF auxiliary light unit is determined according to an AF auxiliary light emission instruction in a case where the strobe 300 performs the pre-emission control process. Then, the pre-emission operation is prohibited during the emission of the AF auxiliary light and in a predetermined period after the emission.

FIG. 18 is a flowchart showing an auto bounce emission photographing process performed with the camera according to the second embodiment of the present invention. It should be noted that steps in FIG. 16 that are the same as the steps in FIG. 4 are indicated by the same reference numbers and the descriptions thereof are omitted.

When determining that the auto bounce operation is performed in the step S11, the camera microcomputer 101 transmits a bounce start instruction to the strobe 300 through the communication line CL (step S1812). When receiving the bounce start instruction, the strobe microcomputer 310 performs the bounce process as mentioned later.

When a bounce process is completed, the strobe microcomputer 310 transmits a bounce end signal to the camera microcomputer 101. After transmitting the bounce start instruction, the camera microcomputer 101 determines whether the bounce end signal is received from the strobe microcomputer 301 (step S1813). The camera microcomputer 101 waits while the bounce end signal is not received (NO in the step S110). On the other hand, when receiving the bounce end signal (YES in the step S1813), the camera microcomputer 101 proceeds with the process to the step S13 described in FIG. 4.

FIG. 19 is a flowchart showing a bounce process performed with the camera according to the second embodiment of the present invention. It should be noted that steps in FIG. 19 that are the same as the steps in FIG. 9 are indicated by the same reference numbers and the descriptions thereof are omitted. However, the bounce process is performed by the strobe microcomputer 310 in FIG. 19 unlike the flowchart shown in FIG. 9.

When determining that the auto bounce is possible (YES in the step S702), the strobe microcomputer 310 checks whether the AF auxiliary light emission instruction (AF_ALEC) is transmitted from the camera microcomputer 101 (step S1903). When the AF auxiliary light emission instruction is received (YES in the step S1903), the strobe microcomputer 310 returns the process to the step S702.

On the other hand, when the AF auxiliary light emission instruction is not received (NO in the step S1903), the strobe microcomputer 310 checks whether predetermined time has passed after the AF auxiliary light emission instruction (step S1904) because the strobe microcomputer 310 cannot read the state of the focusing-purpose distance measuring unit 107 directly.

Figure 20A:
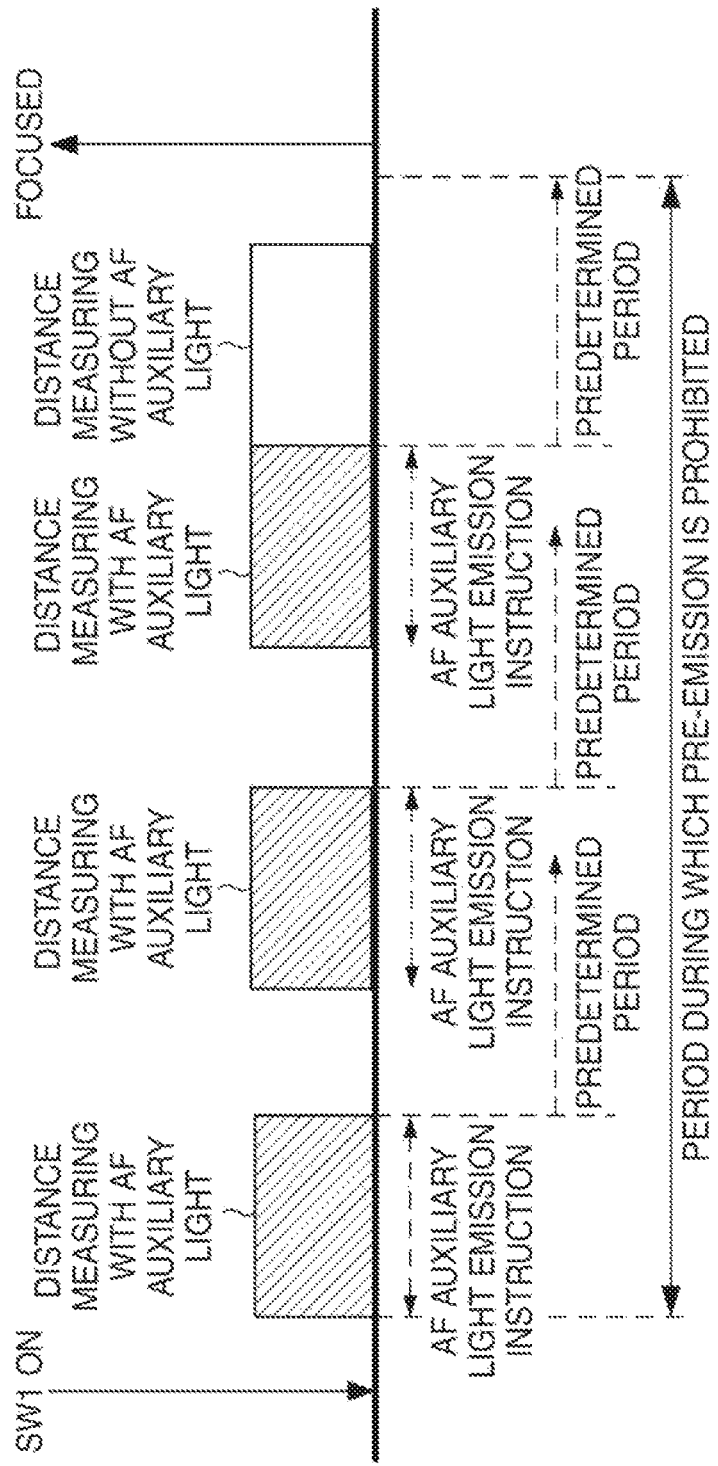
FIG. 20A is a view showing an example of a pre-emission prohibition period set in the camera according to the second embodiment of the present invention.

FIG. 20A is a view showing an example of a pre-emission prohibition period set in the camera according to the second embodiment of the present invention. FIG. 20B is a view showing another example of the pre-emission prohibition period set in the camera according to the second embodiment of the present invention.

The focusing-purpose distance measuring unit 107 may perform the charge-storage operation (AF storage operation) even in a case where there is no AF auxiliary light emission instruction like the period of "distance measuring without AF auxiliary light" shown in FIG. 20A. Accordingly, the AF storage operation is prevented from overlapping with the pre-emission operation for the bounce process by extending the pre-emission prohibition period until predetermined time passes after the last AF auxiliary light emission instruction.

The "distance measuring without AF auxiliary light" may be performed continuously after the "distance measuring with AF auxiliary light" as shown in FIG. 20B. If the above-mentioned predetermined time is set to a period more than the longest AF storage time, the AF storage operation is prevented from overlapping with the pre-emission operation.

Referring back to FIG. 19, when the predetermined time does not passed after the last AF auxiliary light emission instruction (NO in the step S1904), the strobe microcomputer 310 returns the process to the step S702. On the other hand, when the predetermined time passes after the last AF auxiliary light emission instruction (YES in the step S1904), the strobe microcomputer 310 proceeds with the process to the above-mentioned step S704.

Then, the strobe microcomputer 310 performs processes in steps S1908 and S1909 after performing the process in the step S706. It should be that the processes in the steps S1908 and S1909 are the same as the processes in the steps S1903 and S1904.

When the predetermined time does not passed after the last AF auxiliary light emission instruction (NO in the step S1909), the strobe microcomputer 310 returns the process to the step S702. On the other hand, when the predetermined time passes after the last AF auxiliary light emission instruction (YES in the step S1909), the strobe microcomputer 310 proceeds with the process to the step S708.

In the second embodiment, the processes shown in FIG. 10A, FIG. 11A, FIG. 12A, FIG. 13A, FIG. 14, and FIG. 16A that are described so as to be performed in the camera body 100 in the first embodiment are performed in the strobe 300.

In the second embodiment, the emission of the AF auxiliary light unit is determined according to the AF auxiliary light emission instruction when the strobe 300 performs the pre-emission control process. Then, the pre-emission operation is prohibited during the emission of the AF auxiliary light and in a predetermined period after the emission. As a result of this, the focusing in the auto focus is performed correctly and the bounce angle is set correctly.

It should be noted that each of the flowcharts described in the second embodiment is an example. The processes of each of the flowcharts may be performed in an order different from the above-mentioned description if needed. Furthermore, the above-mentioned command, command number, and data are examples, and any settings are allowed as long as they play the same roles.

Subsequently, a camera according to a third embodiment of the present invention will be described. It should be noted that the configuration of the camera of the third embodiment is the same as the camera shown in FIG. 1 and FIG. 2.

In the third embodiment, when the strobe 300 performs a pre-emission control process, it is determined whether the focusing-purpose distance measuring unit is in a charge storage operation by two-way communications between the camera body 100 and the strobe 300. Then, the pre-emission operation is prohibited when the focusing-purpose distance measuring unit is in the charge-storage operation.

FIG. 21 is a flowchart showing a bounce process performed with the camera according to the third embodiment of the present invention. It should be noted that steps in FIG. 21 that are the same as the steps in the flowchart in FIG. 9 are labeled by the same reference numerals, and their descriptions are omitted.

When the auto bounce is possible (YES in the step S702), the strobe microcomputer 310 receives "CS192 command: data X" shown in FIG. 7C from the camera microcomputer 101 (step S2103). Then, the strobe microcomputer 310 determines whether the focusing-purpose distance measuring unit is in the charge storage operation (in the AF storage operation) according to the data received in the step S2103 (step S2104).

When the focusing-purpose distance measuring unit is not in the AF storage operation (NO in the step S2104), the strobe microcomputer 310 shifts the process to the step S704 described in FIG. 9. When the focusing-purpose distance measuring unit is in the charge storage operation (YES in the step S2104), the strobe microcomputer 310 returns the process to the step S702.

Then, the strobe microcomputer 310 performs processes in steps S2108 and S2109 after performing the process in the step S706. It should be that the processes in the steps S2108 and S2109 are the same as the processes in the steps S2103 and S2104.

When the focusing-purpose distance measuring unit is not in the AF storage operation (NO in the step S2109), the strobe microcomputer 310 proceeds with the process to the step S708. On the other hand, when the focusing-purpose distance measuring unit is in the charge storage operation (YES in the step S2109), the strobe microcomputer 310 returns the process to the step S702.

In the third embodiment of the present invention, it is determined whether the focusing-purpose distance measuring unit is in the AF storage operation by the two-way communications between the camera body 100 and the strobe 300. Then, the pre-emission operation is prohibited during the AF storage operation. As a result of this, the focusing in the auto focus is performed correctly and the bounce angle is set correctly.

It should be noted that the flowchart described in the first embodiment is an example. The processes of the flowchart may be performed in an order different from the above-mentioned description if needed. Furthermore, the above-mentioned command, command number, and data are examples, and any settings are allowed as long as they play the same roles.

As is clear from the above description, in the example shown in FIG. 1 and FIG. 2, the strobe microcomputer 310 etc. function as the first control unit, first distance measuring unit, and second control unit, and the camera microcomputer 101 etc. function as the second distance measuring unit, third control unit, and notification unit. Moreover, the strobe microcomputer 310 or the camera microcomputer 101 functions as the prohibition unit.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by an image pickup apparatus. Moreover, the functions of the above mentioned embodiments may be achieved as a control program that is executed by a computer with which the image pickup apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-093996, filed May 1, 2015, which is hereby incorporated by reference herein in its entirety.

What is claimed is:

1. An image pickup apparatus capable of performing emission photographing by using a lighting device having a driving unit which changes an irradiation direction of a light emitted from a light source, the image pickup apparatus comprising:
    at least one processor, executing computer instructions stored in memory, or circuit, configured to function as:
    a focus control unit configured to perform focus control for focusing on an object; and
    a control unit configured to, during a predetermined period set according to an instruction regarding the focus control, when a determination whether or not to emit the light from the light source is made during the predetermined period, prohibit an operation to emit the light from the light source for determining a direction to be targeted in a case where the driving unit changes the irradiation direction.

2. The image pickup apparatus according to claim 1, wherein the predetermined period includes a period which is set according to the instruction regarding the focus control and in which a charge-storage type sensor performs a charge storage operation.

3. The image pickup apparatus according to claim 1, wherein the predetermined period includes a period which is set according to the instruction regarding the focus control and in which another light source different from the light source emits an auxiliary light.

4. The image pickup apparatus according to claim 1, wherein the predetermined period is a predetermined period which is set according to the instruction regarding the focus control and from when an emission instruction to emit an auxiliary light from another light source different from the light source is issued.

5. The image pickup apparatus according to claim 1, wherein the at least one processor, or circuit, is further configured to function as:
    a sending unit configured to send an execution instruction to emit the light from the light source for determining the direction to be targeted,
    wherein, during the predetermined period, the control unit prohibits the sending unit from sending the execution instruction.

6. The image pickup apparatus according to claim 5, wherein the predetermined period includes a period which is set according to the instruction regarding the focus control and in which a charge-storage type sensor performs a charge storage operation.

7. The image pickup apparatus according to claim 5, wherein the predetermined period includes a period which is set according to the instruction regarding the focus control and in which another light source different from the light source emits an auxiliary light.

8. The image pickup apparatus according to claim 5, wherein the predetermined period is a predetermined period which is set according to the instruction regarding the focus control and from when an emission instruction to emit an auxiliary light from another light source different from the light source is issued.

9. A lighting device attachable to an image pickup apparatus, comprising:
    a light source;
    a driving circuit that changes an irradiation direction of a light from the light source; and
    at least one processor, executing computer instructions stored in memory, or circuit, configured to function as:
    a control unit configured to, during a predetermined period set according to an instruction regarding a focus control by the attached image pickup apparatus, when a determination whether or not to emit the light from the light source is made during the predetermined period, prohibit an operation to emit the light from the light source for determining a direction to be targeted in a case where the driving circuit changes the irradiation direction.

10. The lighting device according to claim 9, wherein the at least one processor, or circuit, is further configured to function as:
    a determination unit configured to determine the direction to be targeted based on a first reflected light information obtained by the driving circuit changing the irradiation direction to emit the light from the light source to a first direction and a second reflected light information obtained by the light source emitting the light to a second direction different from the first direction.

11. The lighting device according to claim 9, wherein the at least one processor, or circuit, is further configured to function as:
    a reception unit configured to receive information on the predetermined period from the attached image pickup apparatus.

12. The lighting device according to claim 11, wherein the at least one processor, or circuit, is further configured to function as:
    a determination unit configured to determine the direction to be targeted based on a first reflected light information obtained by the driving circuit changing the irradiation direction to emit the light from the light source to a first direction and a second reflected light information obtained by the light source emitting the light to a second direction different from the first direction.

13. A control method for an image pickup apparatus capable of performing emission photographing by using a lighting device having a driving unit which changes an irradiation direction of a light emitted from a light source, the control method comprising:
    performing focus control for focusing on an object; and
    prohibiting, during a predetermined period set according to an instruction regarding the focus control, when a determination whether or not to emit the light from the light source is made during the predetermined period, an operation to emit the light from the light source for determining a direction to be targeted in a case where the driving unit changes the irradiation direction.

14. The control method according to claim 13, wherein the predetermined period includes a period which is set according to the instruction regarding the focus control and in which a charge-storage type sensor performs a charge storage operation.

15. The control method according to claim 13, wherein the predetermined period includes a period which is set according to the instruction regarding the focus control and in which another light source different from the light source emits an auxiliary light.

16. The control method according to claim 13, wherein the predetermined period is a predetermined period which is set according to the instruction regarding the focus control and from when an emission instruction to emit an auxiliary light from another light source different from the light source is issued.

17. The control method according to claim 13, wherein, during the predetermined period, an execution instruction to emit the light from the light source for determining the direction to be targeted is prohibited from being sent to the lighting device.

18. The control method according to claim 17, wherein the predetermined period includes period which is set according to the instruction regarding the focus control and in which a charge-storage type sensor performs a charge storage operation.

19. The control method according to claim 17, wherein the predetermined period includes period which is set according to the instruction regarding the focus control and in which another light source different from the light source emits an auxiliary light.

20. The control method according to claim 17, wherein the predetermined period is a predetermined period which is set according to the instruction regarding the focus control and from when an emission instruction to emit an auxiliary light from another light source different from the light source is issued.

\* \* \* \* \*